United States Patent [19]

Horikawa et al.

[11] Patent Number: 5,012,095
[45] Date of Patent: * Apr. 30, 1991

[54] RADIATION IMAGE RECORDING AND READ-OUT APPARATUS

[75] Inventors: Kazuo Horikawa; Ichirou Miyagawa, both of Kanagawa, Japan

[73] Assignee: Fuji Photo Film Co., Ltd., Kanagawa, Japan

[*] Notice: The portion of the term of this patent subsequent to Jul. 11, 2006 has been disclaimed.

[21] Appl. No.: 296,733

[22] Filed: Jan. 13, 1989

Related U.S. Application Data

[63] Continuation-in-part of Ser. No. 143,919, Jan. 14, 1988, Pat. No. 4,847,499.

[30] Foreign Application Priority Data

Mar. 19, 1988 [JP] Japan .................... 63-66740
Mar. 19, 1988 [JP] Japan .................... 63-66746
Mar. 19, 1988 [JP] Japan .................... 63-66748

[51] Int. Cl.$^5$ ............................... G01N 23/04
[52] U.S. Cl. ............................... 250/327.2
[58] Field of Search ................ 250/484.1, 327.2

[56] References Cited

U.S. PATENT DOCUMENTS 4,820,922 4/1989 Nakajima ............ 250/484.1 B
4,847,499 7/1989 Horikawa ........... 250/327.2 K

FOREIGN PATENT DOCUMENTS 137146 6/1986 Japan ................ 250/327.2 H

Primary Examiner—Carolyn E. Fields
Attorney, Agent, or Firm—Sughrue, Mion, Zinn, Macpeak & Seas

[57] ABSTRACT

A radiation image recording and read-out apparatus comprises an endless recording belt provided with a stimulable phosphor layer; a group of rollers, around which the recording belt is applied, including two roller sections spaced from each other by a predetermined distance, for circulating the recording belt between the two roller sections along the predetermined distance; an image recording section for exposing the stimulable phosphor layer to radiation; an image read-out section for scanning the stimulable phosphor layer carrying a radiation image stored thereon with stimulating rays; and an erasing section. The predetermined distance between the roller sections is 1-1.5 times as long as the length of the largest single image recordable in the image recording section. The image recording section faces the recording belt moving between the roller sections. The image read-out section carries out scanning of the stimulable phosphor layer with stimulating rays at the circumferential surface of a roller in the group of rollers.

11 Claims, 25 Drawing Sheets

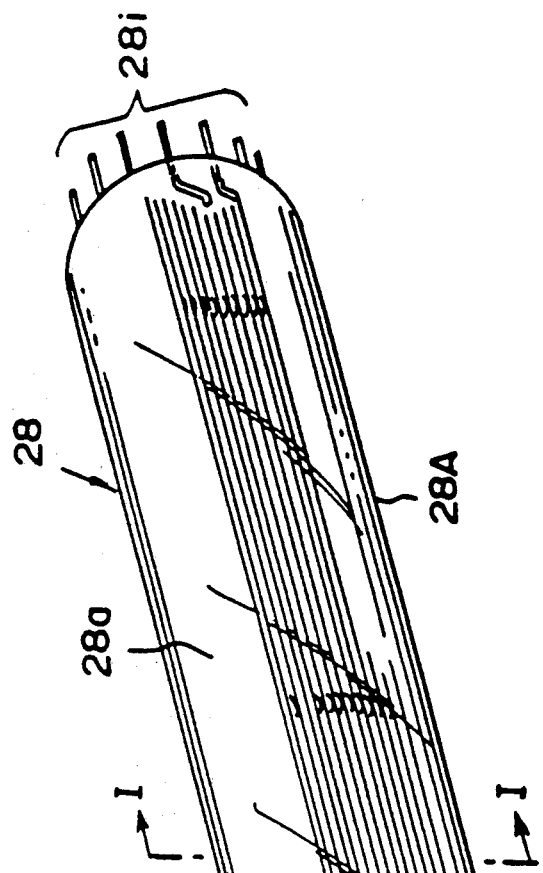
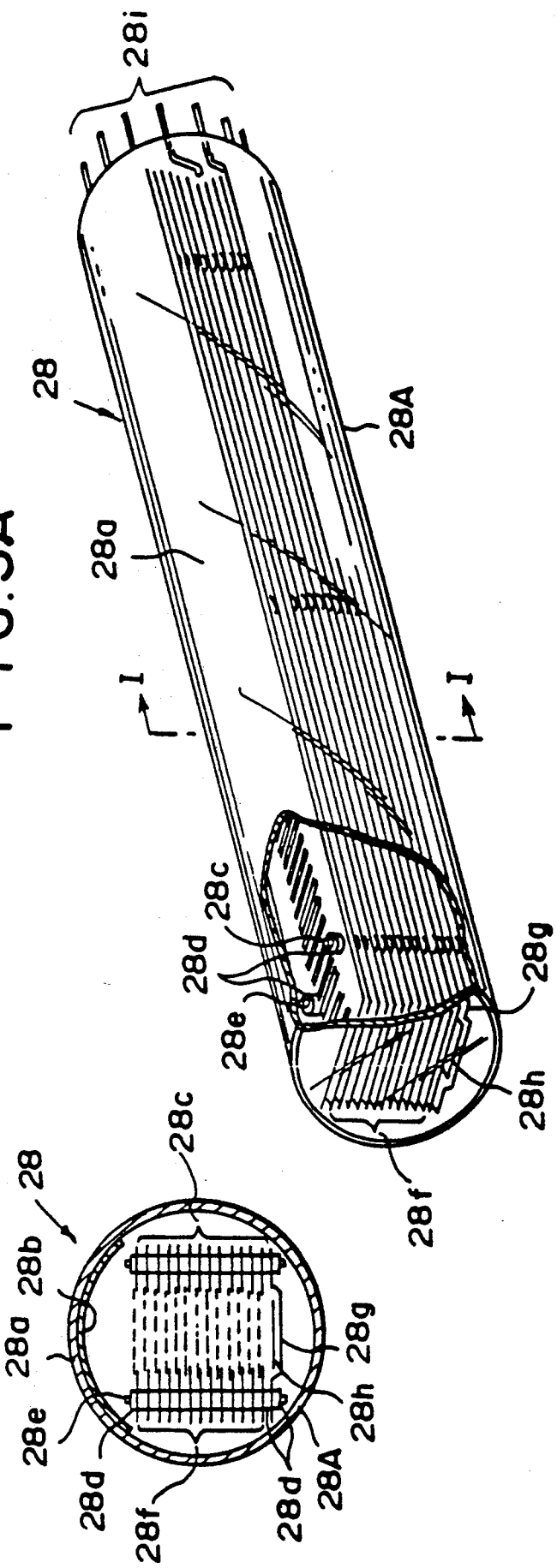

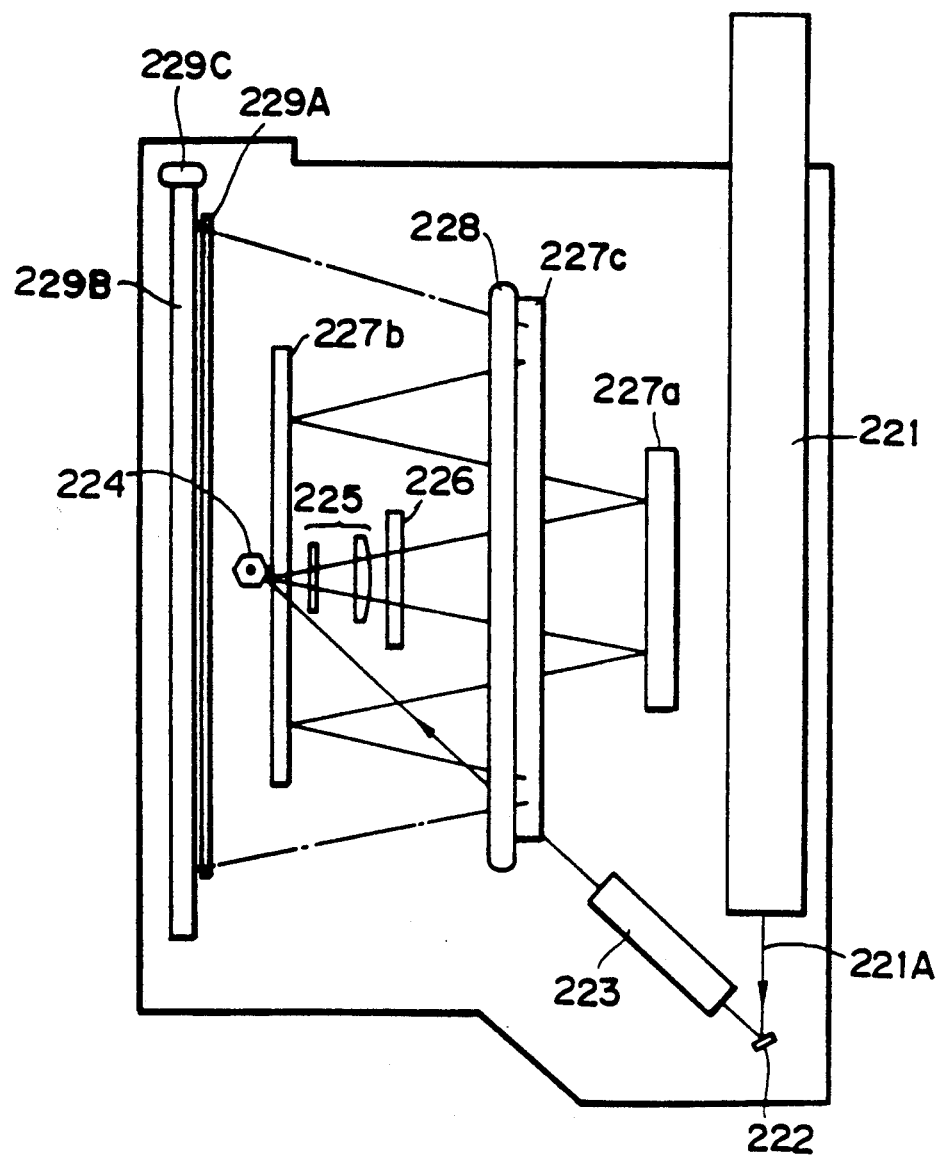
F I G .16

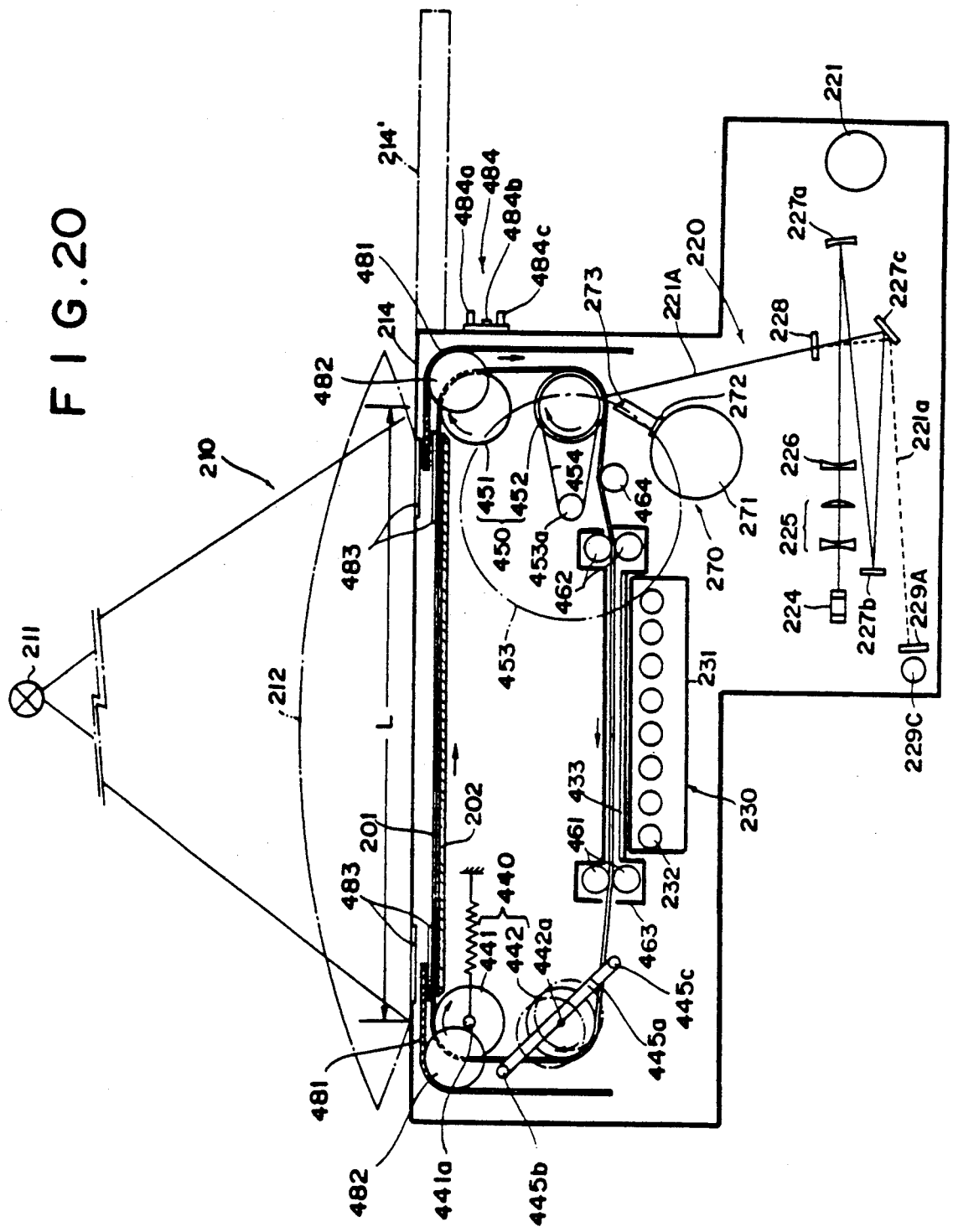

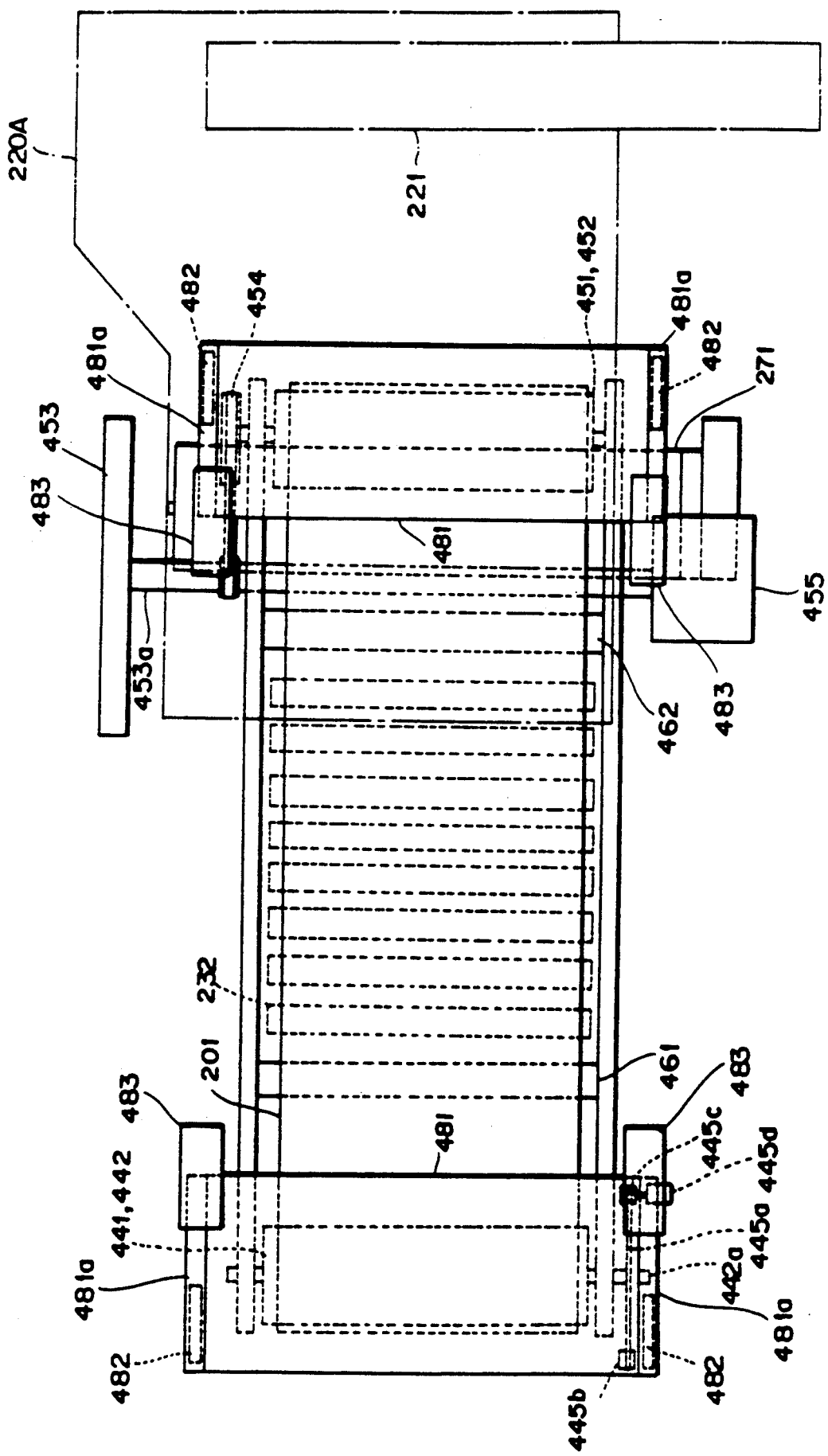

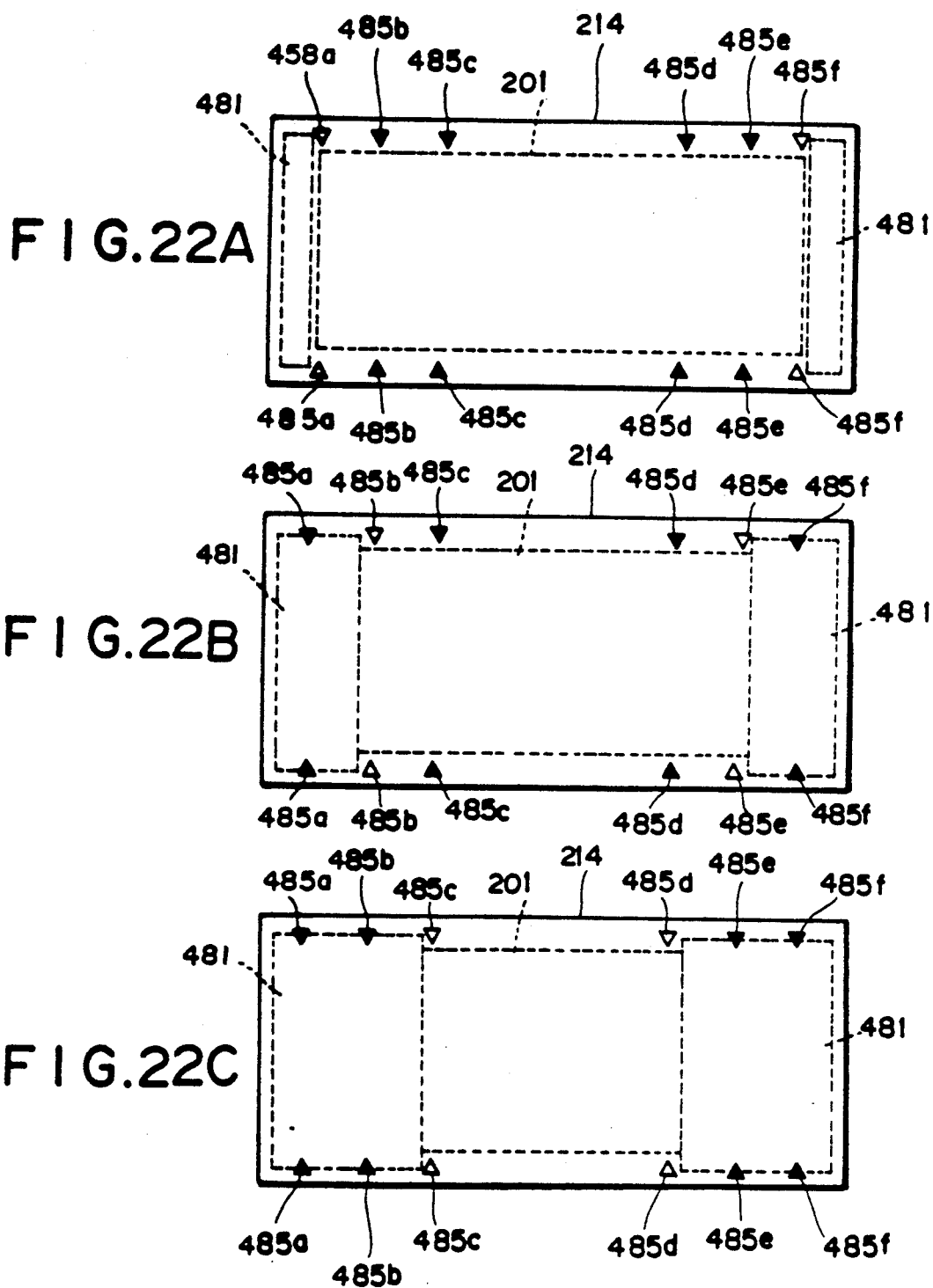

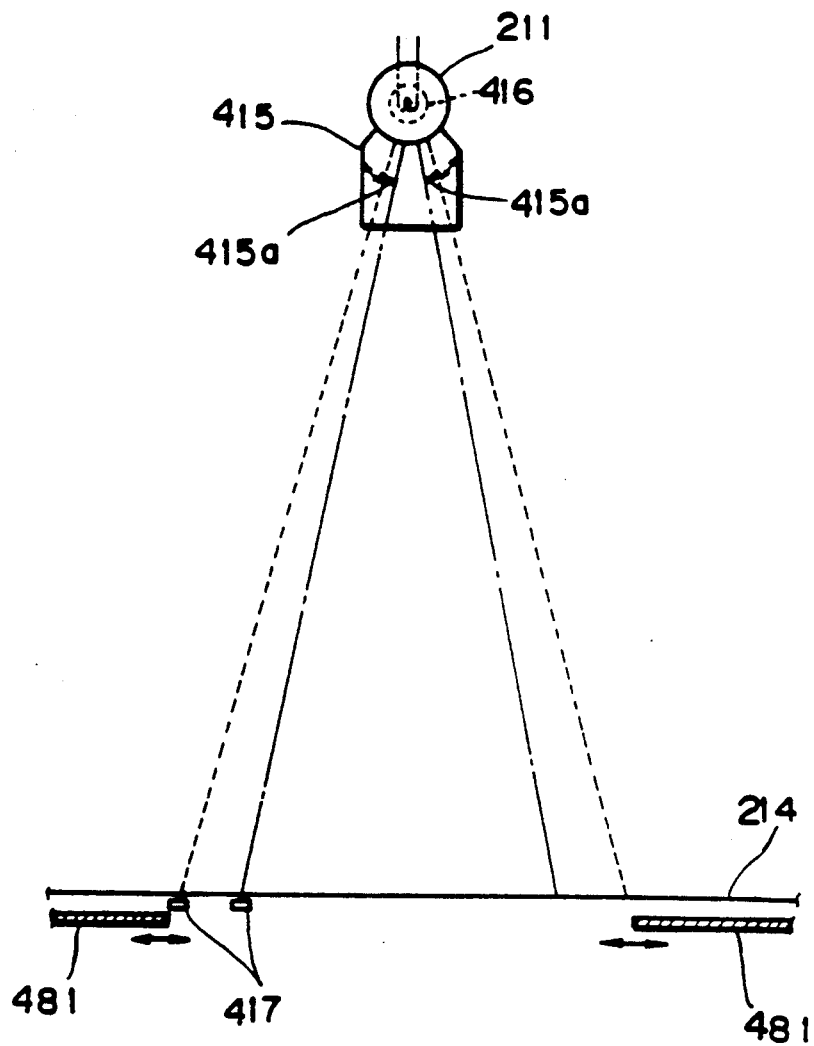

RADIATION IMAGE RECORDING AND READ-OUT APPARATUS

This application is a continuation-in-part application of application Ser. No. 143,919 filed Jan, 14, 1988 which was issued as U.S. Pat. No. 4,847,499 on July 11, 1989.

BACKGROUND OF THE INVENTION

1. Field of the Invention

This invention relates to a radiation image recording and read-out apparatus for recording a radiation image on a stimulable phosphor, exposing the stimulable phosphor to stimulating rays which cause the stimulable phosphor to emit light in proportion to the stored radiation energy, detecting the emitted light to read out the radiation image, and converting the emitted light into an electric signal. This invention particularly relates to a radiation image recording and read-out apparatus which as a whole is small in size.

2. Description of Prior Art

When certain kinds of phosphors are exposed to radiation such as X-rays, α-rays, β-rays, γ-rays, cathode rays or ultraviolet rays, they store part of the energy of the radiation. Then, when the phosphor which has been exposed to radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a recording material provided with a layer of the stimulable phosphor is first exposed to radiation which has passed through an object such as the human body in order to store a radiation image of the object thereon, and is then two-dimensionally scanned by stimulating rays such as a laser beam which cause the recording material to emit light in proportion to the stored radiation energy. The light emitted by the recording material upon stimulation thereof is photoelectrically detected and converted into an electric image signal by a photodetector, and by using the image signal the radiation image of the object can be reproduced as a visible image on a recording medium such as photographic film, a display device such as a cathode ray tube (CRT), or the like.

The radiation image recording and reproducing system using a recording material provided with a stimulable phosphor is advantageous over conventional radiography using a silver halide photographic material in that the image can be accurately recorded even when the stimulable phosphor is exposed to a very wide range (latitude) of radiation energy intensities. More specifically, since the amount of light emitted upon stimulation after the radiation energy is stored on the stimulable phosphor varies over a wide range and is in proportion to the amount of said stored energy, it is possible to obtain an image having a desirable density regardless of the amount of radiation to which the recording material provided with the stimulable phosphor is exposed, by reading out the emitted light with an appropriate read-out gain and converting it into an electric signal in order to reproduce a visible image on a recording medium or a display device.

In the aforesaid radiation image recording and reproducing system, the recording material provided with the stimulable phosphor is used to temporarily store the radiation image in order to reproduce the final visible image therefrom on a final recording medium. For reasons of economy, therefore, it is desirable that the recording material provided with the stimulable phosphor be reusable.

Accordingly, the applicant has proposed, for example in U.S. Pat. No. 4,543,479, a radiation image recording and read-out apparatus which enables the stimulable phosphor to be efficiently circulated and reused.

The proposed radiation image recording and read-out apparatus comprises, in a single apparatus:

(a) a supporting material, (b) at least one recording material attached to said supporting material and comprised of a stimulable phosphor layer capable of storing a radiation image, (c) an image recording section for exposing said recording material to radiation which has passed through an object in order to store a radiation image of the object on said recording material, (d) an image read-out section provided with a stimulating ray source for emitting stimulating rays for scanning said recording material carrying said radiation image stored thereon, and a photoelectric read-out means for obtaining an electric image signal by reading out light emitted by said recording material scanned and stimulated with the stimulating rays, (e) a means for circulating said recording material attached to said supporting material with respect to said image read-out section for enabling reuse of said recording material, and (f) an erasing section for eliminating radiation energy remaining on said recording material prior to recording a next image on said recording material after the preceding radiation image has been read out therefrom at said image read-out section, whereby the recording material is efficiently circulated and reused.

In the proposed radiation image recording and read-out apparatus, it is very advantageous for a material comprising an endless supporting belt with a plurality of stimulable phosphor layers overlaid on the endless supporting belt to be used as the recording material. In this case, the recording material can be applied around rollers or the like and conveyed and circulated sequentially through the image recording section, the image read-out section and the erasing section. An example of such a configuration is shown in FIG. 26.

With reference to FIG. 26, three stimulable phosphor sheets 602 are attached to an endless conveyor 601. The conveyor 601 is provided around rollers 603 and 604, and moved in the direction indicated by the arrow through rotation of the rollers 603 and 604. Around the conveyor 601, an image recording section 610, an image read-out section 620 and an erasing section 630 are disposed sequentially in the direction in which the conveyor 601 travels.

The image recording section 610 is provided with a radiation source 611 which may be an X-ray source or the like, and stores a radiation image of an object 612 on the stimulable phosphor sheet 602 which faces the radiation source 611 with the object 612 interposed. The stimulable phosphor sheet 602 carrying the radiation image thus stored thereon is then sent to the image read-out section 620. The image read-out section 620 is provided with a stimulating ray source 622 for emitting stimulating rays 621A such as the rays of a laser beam, a light deflector 622 constituted of a galvanometer mirror or the like for deflecting the stimulating rays 621A emitted by the stimulating ray source 621 across the width of the conveyor 601, and a photodetector 623 for reading out light 625 emitted by the stimulable phosphor sheet 602 upon stimulation thereof by the stimulating rays 621A. The photodetector 623 may be constituted of a head-on type photomultiplier, a photoelectric amplification channel plate or the like. The light 625 emitted by the stimulable phosphor sheet 602 upon stimulation thereof is guided by a light guide member 624 and then photoelectrically detected by photodetector 623. When the stimulable phosphor sheet 602 on which the image has been recorded has been sent to the image read-out section 620, the stimulable phosphor sheet 602 or the scanning system for the stimulating rays 621A and the system for detecting the light 625 emitted by the stimulable phosphor sheet 602 are moved normal to the direction in which the stimulating rays 621A scan, so that the overall surface of the stimulable phosphor sheet 602 is exposed to the stimulating rays 621A and image read-out is carried out over the overall surface of the stimulable phosphor sheet 602. After the image is read out from the stimulable phosphor sheet 602, the stimulable phosphor sheet 602 is sent to the erasing section 630, which is provided with an erasing light source 631. The erasing light source 631 irradiates light having a wavelength within the stimulation wavelength range of the stimulable phosphor sheet 602 onto the stimulable phosphor sheet 602 to cause it to release any radiation energy remaining thereon. The erasing light source 631 may be constituted of, e.g., a tungsten-filament lamp, a halogen lamp, an infrared lamp, or a laser light source as disclosed in U.S. Pat. No. 4,400,619. The stimulable phosphor sheet 602 erased at the erasing section 630 is again sent to the image recording section 610. In the course of moving to the erasing section 630, the stimulable phosphor sheet 602 is cleaned by a cleaning roller 605, which removes dust from the sheet surface.

However, with the radiation image recording and read-out apparatus shown in FIG. 26, wherein the image recording section and the image read-out section are disposed to face the same surface (the upper surface) of the conveyor, the length of the overall apparatus in the horizontal direction is several times the length of a stimulable phosphor sheet used to store a single radiation image, and therefore the apparatus as a whole is very large. As is well known, the aforesaid radiation image recording and reproducing system is used to great advantage when making medical diagnoses. However, because the recording and reproducing apparatus comprising the recording and read-out apparatus is large, the apparatus can only be installed centrally in a comparatively large-scale hospital, and it is not always possible to install such an apparatus in each medical examination room in a comparatively small-scale hospital. Also, with the aforesaid recording and read-out apparatus the stimulating rays scan the conveyor as it moves between two rollers, and therefore the scanning position on the phosphor sheet is unstable, for example it swings as the conveyor is moved. Therefore, the accuracy of the scanning often deteriorates.

SUMMARY OF THE INVENTION

The primary object of the present invention is to provide a radiation image recording and read-out apparatus which is markedly smaller in size than the conventional radiation image recording and read-out apparatus.

Another object of the present invention is to provide a radiation image recording and read-out apparatus wherein scanning with the stimulating rays is carried out accurately.

The present invention provides a first radiation image recording and read-out apparatus comprising:

(i) a recording belt composed of an endless belt provided with a stimulable phosphor layer, (ii) a group of rollers, around which said recording belt is applied, including two sets of roller sections spaced apart from each other by a predetermined distance, for conveying and circulating said recording belt between said two sets of roller sections along said predetermined distance, (iii) an image recording section for exposing said stimulable phosphor layer to radiation which has passed through an object in order to store a radiation image of the object on said stimulable phosphor layer, (iv) an image read-out section provided with a stimulating ray source for emitting stimulating rays for scanning said stimulable phosphor layer carrying said radiation image stored thereon, and a photoelectric read-out means for obtaining an electric image signal by reading out light emitted by said stimulable phosphor layer, which light is emitted in proportion to the stored radiation energy when said stimulable phosphor layer is scanned and stimulated with the stimulating rays, and (v) an erasing section for eliminating radiation energy remaining on said stimulable phosphor layer prior to recording a next image on said stimulable phosphor layer after the preceding radiation image is read out therefrom at said image read-out section, wherein the improvement comprises:

(a) adjusting said predetermined distance between said two sets of roller sections to 1-1.5 times as long as the length of the largest single image which can be recorded at said image recording section, (b) providing said image recording section so that it faces said recording belt moving between said two sets of roller sections, and (c) providing said image read-out section so that it carries out scanning of said stimulating rays on said stimulable phosphor layer at the circumferential surface of a roller in said group of rollers.

The present invention also provides a second radiation image recording and read-out apparatus comprising:

(i) a recording belt composed of an endless belt constituted of a transparent supporting material and a stimulable phosphor layer formed on a surface of said supporting material, (ii) a group of rollers, around which said recording belt is applied, including two sets of roller sections spaced apart from each other by a predetermined distance, for conveying and circulating said recording belt between said two sets of roller sections along said predetermined distance, (iii) an image recording section for exposing said stimulable phosphor layer to radiation which has passed through an object in order to store a radiation image of the object on said stimulable phosphor layer, (iv) an image read-out section provided with a stimulating ray source for emitting stimulating rays for scanning said stimulable phosphor layer carrying said radiation image stored thereon, and a photoelectric read-out means for obtaining an electric image signal by reading out light emitted by said stimulable phosphor layer, which light is emitted in proportion to the stored radiation energy when said stimulable phosphor layer is scanned and stimulated with the stimulating rays, and (v) an erasing section for eliminating radiation energy remaining on said stimulable phosphor layer by exposing said stimulable phosphor layer to erasing light produced by an erasing light source prior to recording a next image on said stimulable phosphor layer after the preceding radiation image is read out therefrom at said image read-out section, wherein the improvement comprises:

(a) said predetermined distance between said two sets of roller sections is 1-1.5 times as long as the length of the largest single image which can be recorded at said image recording section, (b) said image recording section faces said recording belt moving between said two sets of roller sections, (c) said image read-out section is positioned such that scanning by said stimulating rays is carried out on a portion of said stimulable phosphor layer present on the circumferential surface of a roller in said group of rollers, and (d) at least one roller in said group of rollers, which roller is present on a downstream side of said image read-out section as viewed in the direction of conveyance of said recording belt, is a hollow transparent roller, and said erasing light source is provided inside of said transparent roller.

In the first and second radiation image recording and read-out apparatuses in accordance with the present invention, the stimulable phosphor layer may be formed over the overall surface of the endless belt. Alternatively, one or a plurality of stimulable phosphor layers each having a length equal to or slightly longer than the length of the largest single radiation image may be formed on the endless belt. Also, the group of rollers may be composed of the above-mentioned two sets of roller sections alone or include other rollers in addition thereto as long as they can convey the recording belt between the two sets of roller sections without projecting it outward. Each of the roller sections is composed of a single roller or a plurality of rollers. By the term "distance between said two sets of roller sections" as used herein is meant the length between the most distant edges of the roller sections (which also applies to the third and fourth apparatuses of the present invention).

The present invention further provides a third radiation image recording and read-out apparatus comprising:

(i) a recording belt composed of an endless belt provided with a stimulable phosphor layer, (ii) a group of rollers, around which said recording belt is applied, including two sets of roller sections spaced apart from each other by a predetermined distance, for conveying and circulating said recording belt between said two sets of roller sections along said predetermined distance, (iii) an image recording section for exposing said stimulable phosphor layer to radiation which has passed through an object in order to store a radiation image of the object on said stimulable phosphor layer, (iv) an image read-out section provided with a stimulating ray source for emitting stimulating rays for scanning said stimulable phosphor layer carrying said radiation image stored thereon, and a photoelectric read-out means for obtaining an electric image signal by reading out light emitted by said stimulable phosphor layer, which light is emitted in proportion to the stored radiation energy when said stimulable phosphor layer is scanned and stimulated with the stimulating rays, and (v) an erasing section for eliminating radiation energy remaining on said stimulable phosphor layer prior to recording a next image on said stimulable phosphor layer after the preceding radiation image is read out therefrom at said image read-out section, wherein the improvement comprises:

(a) said predetermined distance between said two sets of roller sections being made 1-1.5 times as long as the length of the largest single image which can be recorded at said image recording section, and each of said roller sections is composed of two roller subsections separated from each other so that an imaginary line connecting them is normal to an imaginary line connecting said two sets of roller sections, (b) said group of rollers being provided with an idle roller section between said two roller subsections of on of said two sets of roller sections, and an idle roller section between said two roller subsections of the other of said two sets of roller section, said idle roller sections being moveable so as to change lengths over which said recording belt is conveyed.

(c) said image recording section being provided so as to face said recording belt moving between a roller subsection of one of said two sets of roller sections and a roller subsection of the other of said two sets of roller sections, which roller subsections face each other, and (d) said image read-out section being positioned such scanning by said stimulating rays is carried out on a portion of said stimulable phosphor layer present on a roller in said group of rollers, which roller is outside of said idle roller sections.

In the third radiation image recording and read-out apparatus in accordance with the present invention, the two roller subsections of each set of roller sections and the idle roller sections may each be composed of a single roller or a plurality of rollers. Each idle roller section may be connected directly to a drive means such as a motor, or may be connected to an urging means such as a spring so that the position of the idle roller section is changed in accordance with the movement of the recording belt.

The present invention still further provides a fourth radiation image recording and read-out apparatus comprising:

(i) a recording belt composed of an endless belt provided with a stimulable phosphor layer, (ii) a group of rollers, around which said recording belt is applied, including two sets of roller sections spaced apart from each other by a predetermined distance, for conveying and circulating said recording belt between said two sets of roller sections along said predetermined distance, (iii) an image recording section for exposing said stimulable phosphor layer to radiation which has passed through an object in order to store a radiation image of the object on said stimulable phosphor layer, (iv) an image read-out section provided with a stimulable ray source for emitting stimulating rays for scanning said stimulable phosphor layer carrying said radiation image stored thereon, and a photoelectric read-out means for obtaining an electric image signal by reading out light emitted by said stimulable phosphor layer, which light is emitted in proportion to the stored radiation energy when said stimulable phosphor layer is scanned and stimulated with the stimulating rays, and (v) an erasing section for eliminating radiation energy remaining on said stimulable phosphor layer prior to recording of a next image on said stimulable phosphor layer after the preceding radiation image is read out therefrom at said image read-out section, wherein the improvement comprises:

(a) said predetermined distance between said two sets of roller sections being made 1-1.5 times as long as the length of the largest single image which can be recorded in said image recording section, (b) said image recording section being provided so as to face said recording belt moving between said two sets of roller sections, and is provided with a radiation blocking shutter moveable between a closed position, at which said radiation blocking shutter covers a portion of said recording belt located at an edge of the image recording area in said image recording sections, and an open position at which said radiation blocking shutter is retracted from above said recording belt in said image recording section, and (c) said image read-out section being positioned such that scanning by said stimulating rays is carried out on a portion of said stimulable phosphor layer present on the circumferential surface of a roller in said group of rollers.

In the fourth radiation image recording and read-out apparatus in accordance with the present invention, in its closed position the radiation blocking shutter may reduce either the length or width of the area of the recording belt exposed to radiation, the length being taken as the edge of the image recording area parallel to the direction of conveyance and circulation of the recording belt in the image recording section. However, as an erasing light source at the erasing section generally extends at least over the width of the recording belt, it is only necessary for efficient erasing that the radiation blocking shutter reduce the length of the area of the recording belt exposed to radiation. The size and the position of the portion of the recording belt which is covered by the radiation blocking shutter may be determined arbitrarily in accordance with the apparatus. Each of the roller sections may be composed of a single roller or a plurality of rollers.

With the first to fourth radiation image recording and read-out apparatuses in accordance with the present invention wherein the stimulable phosphor layer is formed on the recording belt, the distance between the two sets of roller sections in the group of rollers for conveying and circulating the recording belt is adjusted to 1-1.5 times the length of the largest single image, and the width of the overall apparatus can be decreased to approximately the length of the largest single image. The recording belt can be disposed at the image recording position without substantially increasing the size of the apparatus. The apparatus as a whole can be made small by decreasing the length of the apparatus to a value much smaller than the conventional one. Therefore, the radiation image recording and read-out apparatus in accordance with the present invention can be easily installed in small-scale medical facilities where a conventional recording and read-out apparatus of this type could not easily be installed, and thus the range of facilities in which the apparatus can be utilized can be expanded. Also, with the radiation image recording and read-out apparatus in accordance with the present invention wherein the stimulating rays scan across the circumferential surface of a roller, the point at which the movement of the recording belt is stablest, the scanning to read-out the image can be carried out accurately and reliably.

Also, with the second radiation image recording and read-out apparatus in accordance with the present invention, at least one roller in the group of rollers is a hollow transparent roller, and the erasing light source is provided inside of the transparent roller so that erasing is carried out from a position inside of the space defined by the recording belt. Therefore, when compared with an apparatus wherein the erasing section is provided outward from the recording belt, the apparatus can be further reduced in size.

Further, with the third radiation image recording and read-out apparatus in accordance with the present invention, the idle roller sections are provided so that the lengths of conveyance of the recording belt on the upstream and downstream sides of the image recording section are changed. Therefore, even if a portion of the recording belt must be kept stationary at the image recording section, other portions of the recording belt can be moved. Accordingly, image recording and image read-out can be carried out simultaneously, and a plurality of image recording steps can be carried out efficiently.

Moreover, with the fourth radiation image recording and read-out apparatus wherein the image recording section is provided with a radiation blocking shutter, when a small image is to be recorded, a portion of the recording belt outside of the predetermined radiation exposure area can be covered by the radiation blocking shutter so that radiation produced by a radiation source and radiation scattered by an object do not impinge upon said portion of the recording belt outside of the predetermined radiation exposure area. Accordingly, at the erasing section erasing must be carried out only on an area, the size of which is determined in accordance with the size of the recorded image, and erasing can be achieved efficiently.

BRIEF DESCRIPTION OF THE DRAWINGS

FIG. 3A is a perspective view showing a venetian blind type photomultiplier, FIG. 3B is a sectional view taken along line I—I of FIG. 3A, FIG. 16 is a plan view showing the image read-out section in the embodiment shown in FIG. 15, FIGS. 17A through 17G and FIGS. 18A through 18H are explanatory schematic views showing the relationships between the movement of idle rollers and the operation of element of the apparatus in the embodiment shown in FIG. 15, FIG. 20 is a side view showing an embodiment of the fourth radiation image recording and read-out apparatus in accordance with the present invention;

FIG. 21 is a plan view showing the major part of the embodiment shown in FIG. 20, FIGS. 22A, 22B, 22C, 23A and 23B are plan views showing an image recording table, FIG. 25 is a schematic view showing an image recording section utilizing a radiation source provided with an irradiation field stop.

DESCRIPTION OF THE PREFERRED EMBODIMENTS

The present invention will hereinbelow be described in further detail with reference to the accompanying drawings.

Figure 1:
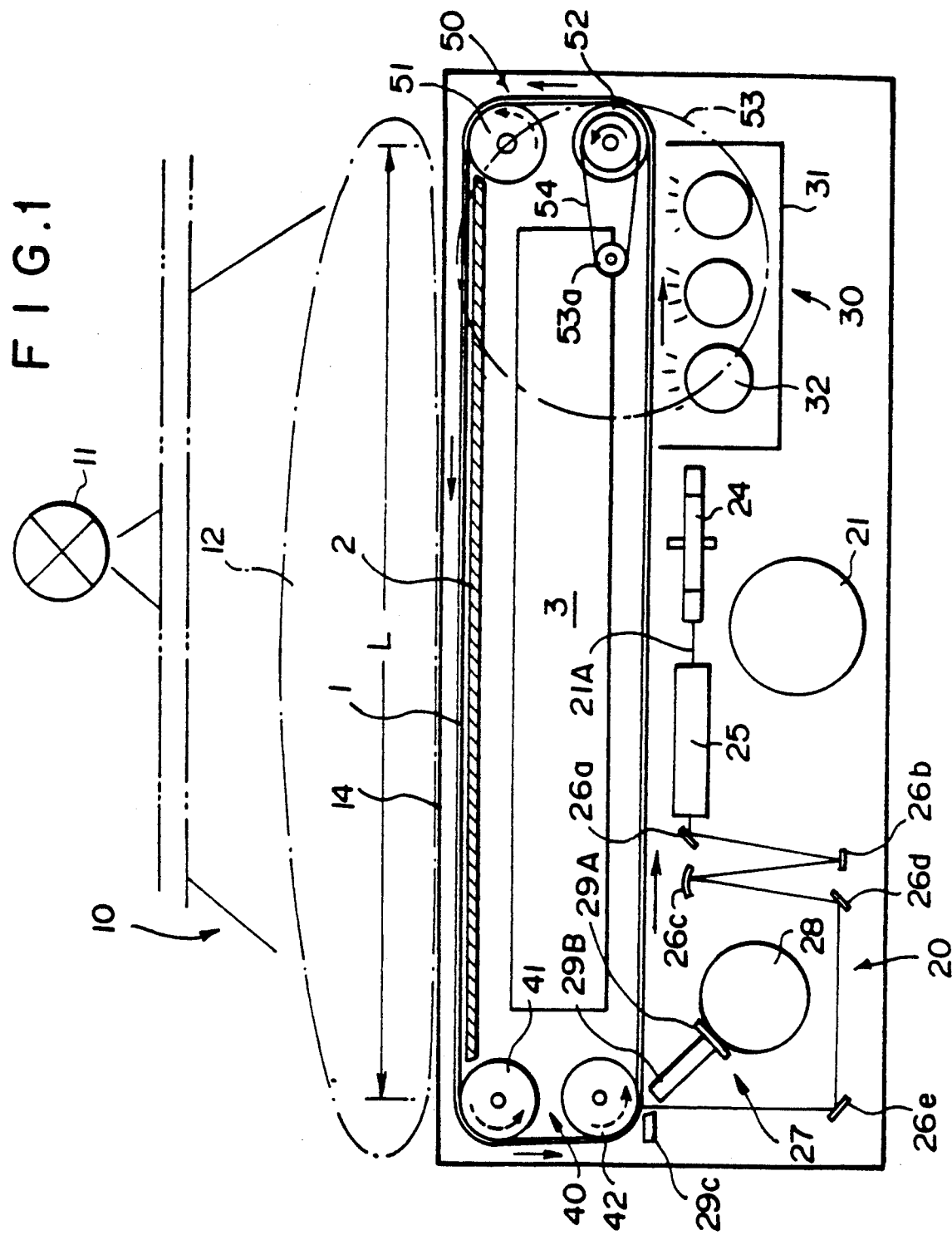
FIG. 1 is a side view showing an embodiment of the first radiation image recording and read-out apparatus in accordance with the present invention.
Figure 2:
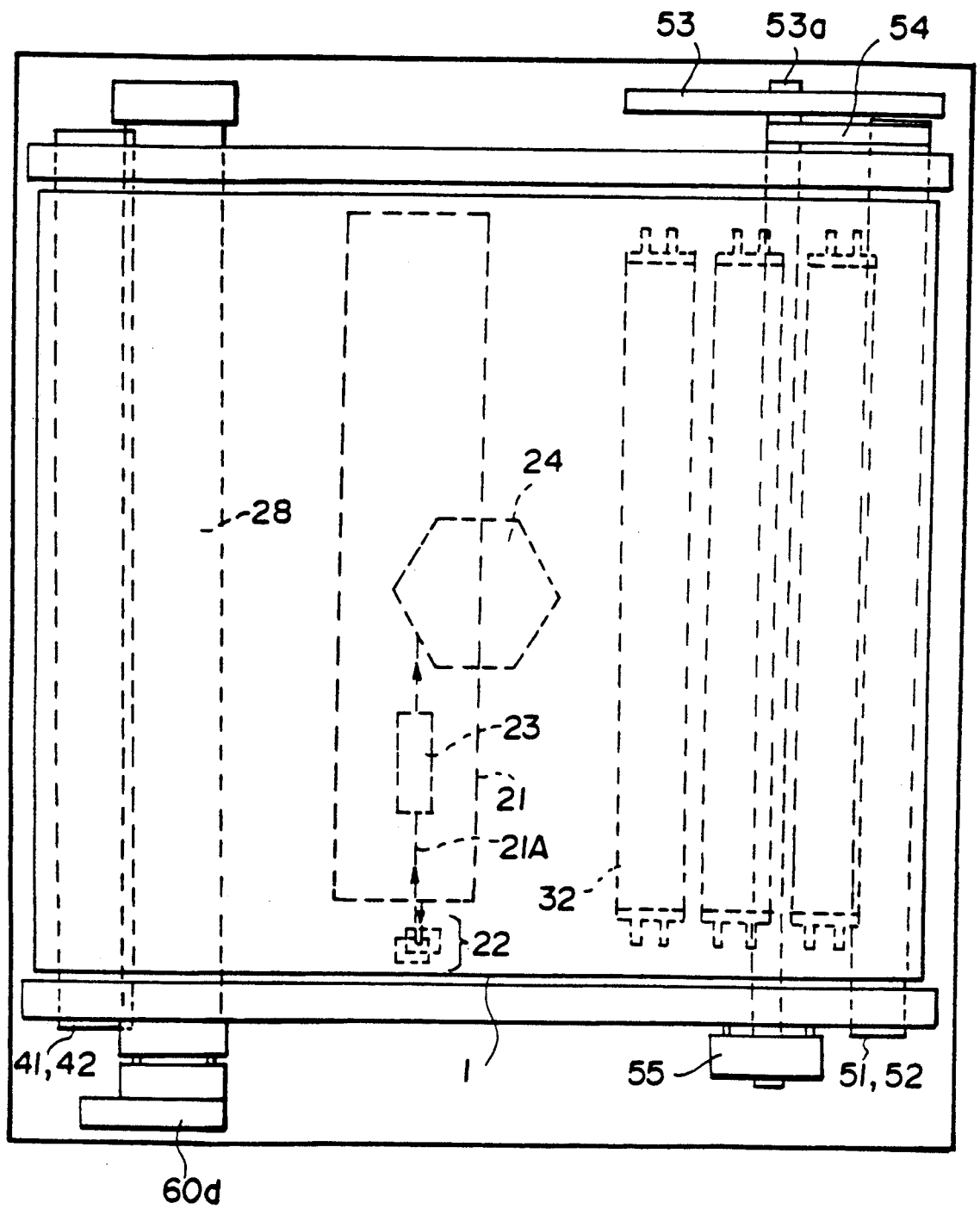
FIG. 2 is a plan view showing the major part of the embodiment shown in FIG. 1.

With reference to FIGS. 1 and 2, a recording belt 1 composed of an endless belt on which a stimulable phosphor layer is formed over the overall surface is applied around a first roller section 40, constituted of rollers 41 and 42, and a second roller section 50, constituted of rollers 51 and 52 and spaced by a predetermined distance L from the first roller section 40. The recording belt 1 is supported on a radiation blocking support 2 and is conveyed and circulated in the direction indicated by the arrows around the first roller section 40 and the second roller section 50. In this embodiment, the group of rollers is composed of these first and second roller sections 40 and 50 alone. A radiation source 11 constituted of an X-ray source of the like is disposed above and facing the recording belt 1. An upper region of the apparatus including the radiation source 11 and an image recording table 14 on which an object 12 is to be placed constitutes an image recording section 10.

At the image recording section 10, the radiation source 11 is activated to produce radiation which passes through the object 12 placed on the image recording table 14, and a radiation image of the object 12 is projected onto the recording belt 1. In this manner, a radiation image of the object 12 is stored on the stimulable phosphor layer of the recording belt 1. The distance L between the first roller section 40 and the second roller section 50 is adjusted to be approximately equal to the length of a single recorded image. Therefore, the aforesaid radiation image is stored over the overall upper portion of the recording belt 1 by a single image recording step. The above-mentioned single recorded image refers to the largest of the various image sizes which can be recorded in the apparatus. A smaller image is recorded on a proper part of the upper portion of the recording belt.

As long as image recording is being carried out, the recording belt 1 is kept stationary at a predetermined position so that the portion of the recording belt 1 on which the image is being recorded faces the radiation source 11. When recording of an image is finished, the recording belt 1 is conveyed by rollers 41, 42, 51 and 52, which rotates in the directions indicated by the arrows, and the portion of the recording belt 1 on which the image was recorded is conveyed to an image read-out section 20 disposed on the left side of the apparatus below the recording belt 1. Of the rollers 41, 42, 51 and 52, only the roller 52 is a drive roller and is connected to a shaft 53a of a motor 53 by a belt or a chain 54. The other rollers 41, 42 and 51 are drive rollers, which rotate by the action of the drive roller 52. As shown in FIG. 2, a rotary encoder 55 is secured to the shaft 53a of the motor 53 for detecting the degree of rotation of the motor 53 and carrying out various control operations.

At the image read-out section 20, a stimulating ray source 21 constituted of an He-Ne laser or the like extends normal to the direction of conveyance of the recording belt 1. Also, a rotating polygon mirror 24, serving as a light deflector, causes the stimulating rays 21A to scan across the width of the recording belt 1. The polygon mirror 24 is provided in the optical path of the stimulating rays 21A. Scanning across the width of the recording belt is defined as the main scanning direction. The stimulating rays 21A are normal to the plane of the sheet of FIG. 1. As shown in FIG. 2, the direction of travel of the stimulating rays 21A produced by the stimulating ray source 21 is changed by a mirror group 22, and the stimulating rays 21A pass through a light input optical system 23 provided with a beam expander, a cylindrical lens or the like, and then impinge upon the rotating polygon mirror 24. As shown in FIG. 1, the stimulating rays 21A reflected and deflected by the rotating polygon mirror 24 pass through a scanning optical system 25 composed of an fθ lens or the like, after which the direction of travel of the stimulating rays 21A is changed by mirrors 26a, 26b, 26c, 26d and 26e. The stimulating rays 21A then repeatedly scan the recording belt 1 on the lower circumferential surface of the roller 42 in the main scanning direction. The mirror 26c is a cylindrical mirror for converging the stimulating rays 21A only in a plane parallel to the sheet of FIG. 1. In the aforesaid optical system, the mirror 26c and the cylindrical lens in the aforesaid light input optical system 23 prevent pitch nonuniformity in the scanning lines from arising on the recording belt 1 even should the axis, mirror surface inclination or the like of the rotating polygon mirror 24 deviate. Simultaneously with the scanning of the stimulating rays 21A in the main scanning direction, the recording belt 1 is conveyed at a predetermined speed by the rollers 41, 42, 51 and 52 in the sub-scanning direction as indicated by the arrow in FIG. 1. Accordingly, the stimulating rays 21A are irradiated over nearly the overall surface of the recording belt portion carrying the radiation image, which was stored thereon in the image recording section 10.

As the recording belt 1 is exposed to the stimulating rays 21A, the exposed part of the recording belt 1 emits light in proportion to the stored radiation energy, and the emitted light is detected by a photoelectric read-out means 27. In this embodiment, the photoelectric read-out means 27 comprises a long photomultiplier 28 extending in the main scanning direction at least over the length of the main scanning light, a filter 29A in close contact with the light receiving face of the photomultiplier 28 for selectively transmitting only the light emitted by the recording belt 1 and filtering out the stimulating rays 21A reflected by the surface of the recording belt 1 to the photomultiplier 28, and a light guide member 29B in close contact with the filter 29A for substantially guiding the light emitted by the recording belt 1 to the photomultiplier 28. By way of example, as shown in FIGS. 3A and 3B, the photomultiplier 28 has the electrode configuration generally called the venetian blind type of configuration. Also, a mirror 29C is disposed to face the photoelectric read-out means 27 for efficiently reflecting the light, which is emitted by the recording belt 1 toward the mirror 29C, to the light receiving face of the light guide member 29B. With reference to FIGS. 3A and 3B, the photomultiplier 28 comprises a cylindrical body 28A, a photocathode 28b disposed along the inner surface of the body 28A so as to face a light receiving face 28a, and a multiplying section 28f disposed under the photocathode 28b and including a plurality (13 pieces in this embodiment) of plate-like dynode 28c which are stacked via insulating members 28d, 28d secured by pins 28e, 28e. Each dynodes 28c is constituted of a conductive plate provided with a plurality of sections cut in a U-shape and bent to form a blind-like shape. A shield electrode 28g is secured by the pins 28e, 28e under the multiplying section 28f via the insulating members 28d, 28d, and an anode 28h is disposed inside of the shield electrode 28g. These electrodes are electrically connected in a one-to-one relation with the terminals of a terminal group 28i disposed at one side end of the body 28A. The shield electrode 28g need not necessarily be provided.

Figure 4:
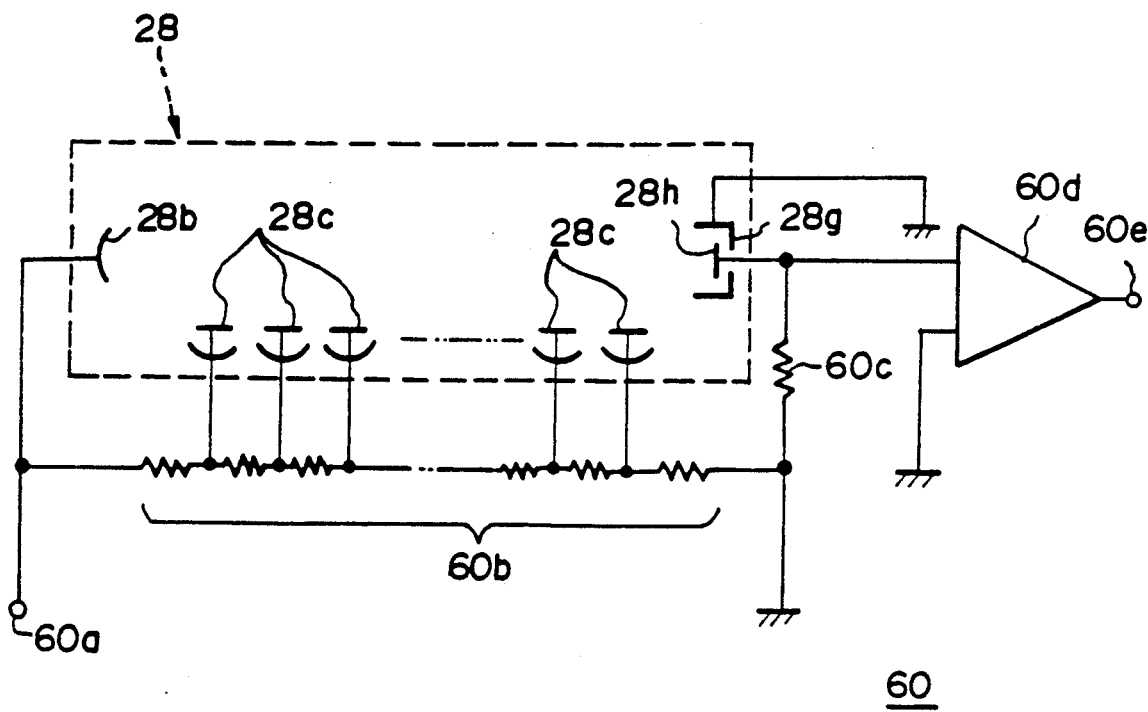
FIG. 4 is a circuit diagram showing the drive circuit for the photomultiplier shown in FIG. 3A.

FIG. 4 shows an electric circuit 60 for operating the photomultiplier 28 and obtaining a photoelectric output. In FIG. 4, similar elements are numbered with the same reference numerals with respect to FIG. 3A. A high negative voltage is applied to the photocathode 28b at a high negative voltage applying terminal 60a. The high negative voltage applied to the high negative voltage applying terminal 60a is divided by a bleeder resistance group 60b into voltages which are applied respectively to the dynodes 28c. The shield electrode 28g is grounded, and the anode 28h is connected to one end of a resistor 60c, the other end of which resistor 60c is grounded, and is also connected to one of the terminals of an amplifier 60d. The other terminal of the amplifier 60d is grounded. Photoelectrically converted image information is obtained as an electric signal from an output terminal 60e of the amplifier 60d. The electric signal thus obtained is subjected to any required image processing, and then sent to a display device such as a CRT or an image reproducing apparatus, such as a recording apparatus for carrying out light beam scanning recording on a photosensitive film. By way of example, as shown in FIG. 1, a control circuit section 3 housing printed circuit boards or the like for controlling image processing or the like is provided inside of the loop defined by the recording belt 1.

The portion of the recording belt 1 on which the image read-out process has been finished is moved by the first roller section 40 and the second roller section 50 to an erasing section 30. The erasing section 30 comprises a case 31, and a plurality of (by way of example, three) erasing light sources 32, 32, . . . constituted of fluorescent lamps or the like and disposed in the case 31. The erasing light sources 32, 32, . . . produce erasing light having a wavelength mainly within the stimulation wavelength range of the stimulable phosphor layer of the recording belt 1. The erasing light is irradiated over the overall image forming area of the recording belt 1 while the recording belt 1 is being conveyed, which releases any radiation energy remaining on the stimulable phosphor layer of the recording belt 1 after the image read-out process is finished. A lead plate 2 for blocking radiation is provided below the image recording table 14 so that the radiation produced by the radiation source 11 when an image is being recorded does not adversely affect the image read-out section 20, the erasing section 30, or the recording belt 1 positioned therein. Also, in this embodiment, image read-out and erasing are carried out sequentially on a single image forming area. The recording belt portion which has been erased in the erasing section 30 is then conveyed to the image recording section 10 for reuse in recording another image.

With this embodiment wherein the distance between the two roller sections is adjusted to be approximately equal to the length of the largest single image which can be recorded, the image recording section 10 is disposed above the recording belt 1, and the image read-out section 20 and the erasing section 30 are disposed below the recording belt 1, the length of the overall apparatus in the horizontal direction can be decreased to a value approximately equal to the length of the above-mentioned single largest image, and the recording and read-out apparatus which has heretofore been large can be made markedly smaller. Also, the scanning of the stimulating rays 21A in the main scanning direction is carried out on the circumferential surface of the roller 42 which conveys the recording belt 1. Therefore, the recording belt 1 moves in a very stable way at the position at which it is scanned, and the scanning done in order to read-out an image can be carried out accurately.

The stimulable phosphor layer need not necessarily be formed on the overall surface of the recording belt 1, and one or a plurality of the stimulable phosphor layers each extending the length of a single image may be formed at portions of the recording belt 1. Also, the first roller section 40 and the second roller section 50 may each be constituted of a single roller or of three or more rollers. Further, the distance L between the two sets of roller sections may be made longer than the distance in this embodiment, but it may not be more than 1.5 times as long as the length of the largest image recordable in the apparatus. The configurations of the other parts of the apparatus are not limited to those described in the aforesaid embodiment.

Figure 5:
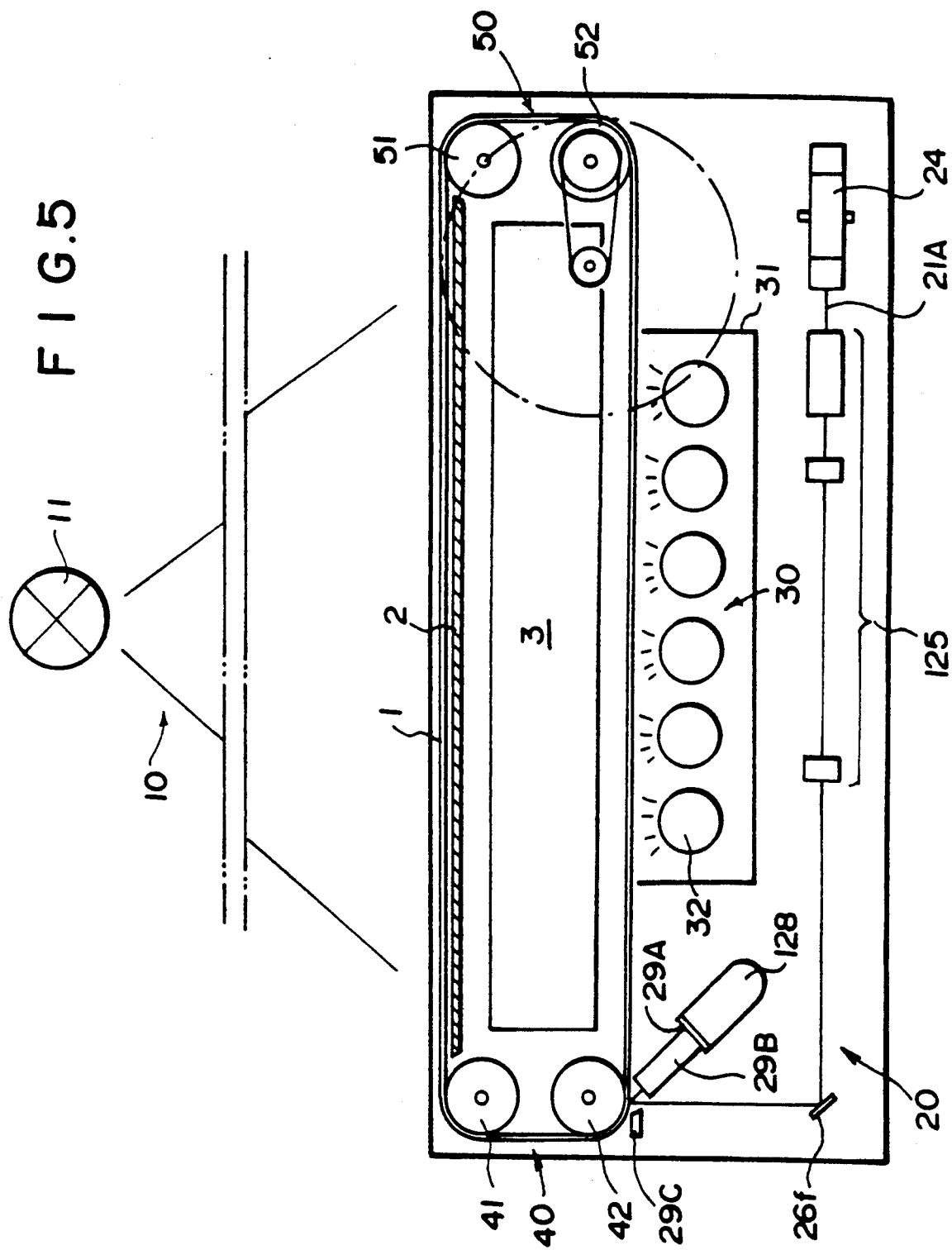
FIG. 5 is a side view showing another embodiment of the first radiation image recording and read-out apparatus in accordance with the present invention.

Another embodiment of the first radiation image recording and read-out apparatus in accordance with the present invention will hereinbelow be described with reference to FIG. 5 and those that follow. In FIG. 5, similar elements are numbered with the same reference numerals with respect to FIG. 1.

Figure 6:
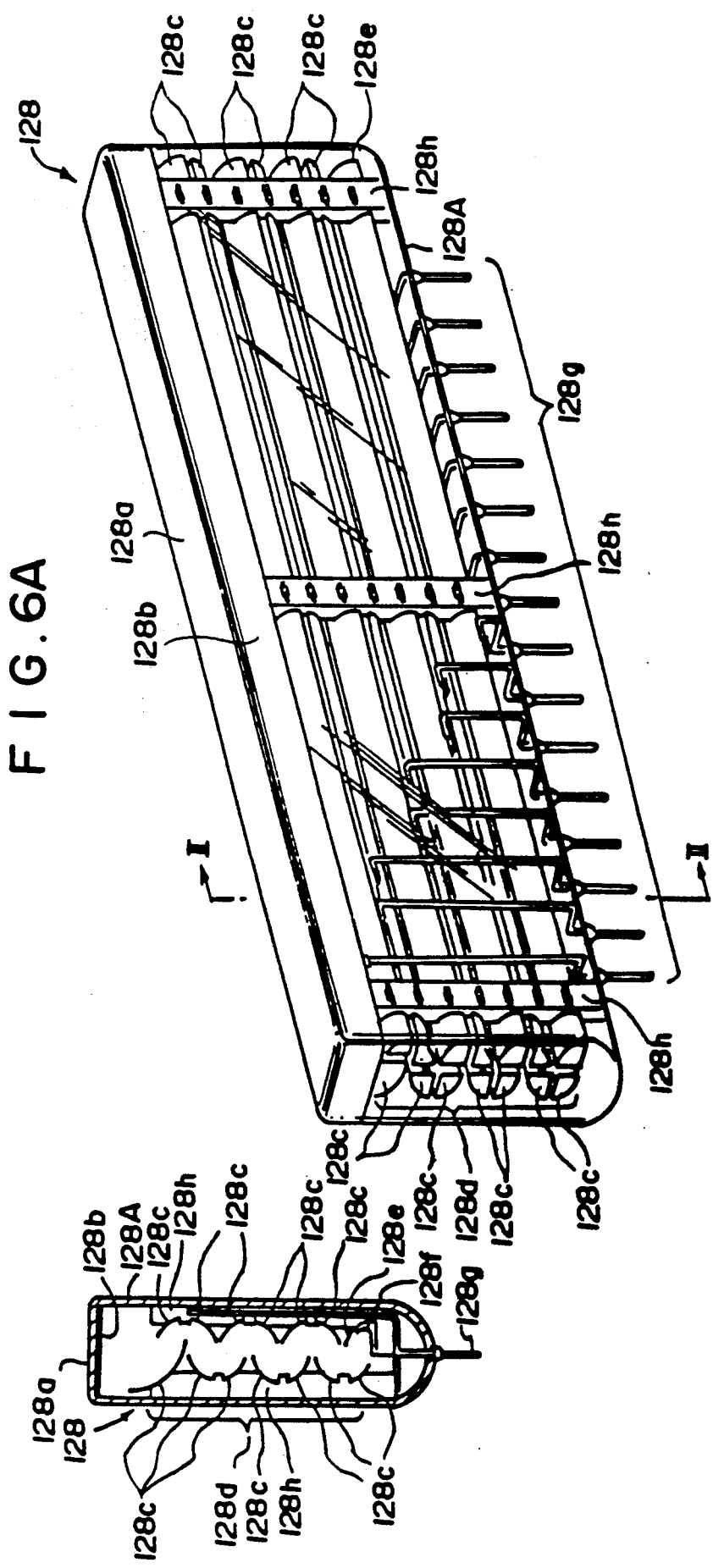
FIG. 6A is a perspective view showing a box type photomultiplier.
FIG. 6B is a sectional view taken along line II—II of FIG. 6A.

With reference to FIG. 5, the erasing section 30 is disposed at the center below the recording belt 1, and the optical elements of the image read-out section 20 such as the rotating polygon mirror 24, a lens system 125 and a reflection mirror 26f for guiding the stimulating rays 21A to the scanning position are disposed under the erasing section 30. Also, a long photomultiplier 128 at the image read-out section 20 has the electrode configuration generally called the box type of configuration. FIGS. 6A and 6B show the box type photomultiplier 128.

The photomultiplier 128 comprises a vacuum body 128A, a photocathode (photoelectric face) 128b disposed so as to face a long light receiving face 128a for producing photoelectrons in the vacuum body 128A, and a multiplying section 128d disposed under the photocathode 128b in the vacuum body 128A and including a plurality of electrodes (dynodes) 128c, 128c, ... shaped like a quarter of a cylinder and exhibiting the secondary electron emission effect. A shield electrode 128e is disposed so as to face the lowermost dynode 128c of the multiplying section 128d, and an anode 128f for collecting the electron streams multiplied by the multiplying section 128d and generating a signal is positioned inside of the shield electrode 128e. These electrodes are respectively connected electrically in a one-to-one relation with the terminals of a terminal group 128g disposed on the side of the photomultiplier 128 opposite to the light receiving face 128a. The number of terminals equals the number of electrodes. The dynodes 128c, 128c, ... and the shield electrode 128e are secured inside of the body 128A by supporting members 128h, 128h, 128h fabricated of an insulating material. For obtaining image information from the photoelectric output of the photomultiplier 128, the circuit shown in FIG. 4 may be used. In the box type photomultiplier 128, the shield electrode 128e need not necessarily be provided. The long photomultiplier used in the present invention may also be fabricated by extending a photomultiplier provided with a multiplying section comprising another known electrode or other known electrodes.

Figure 7:
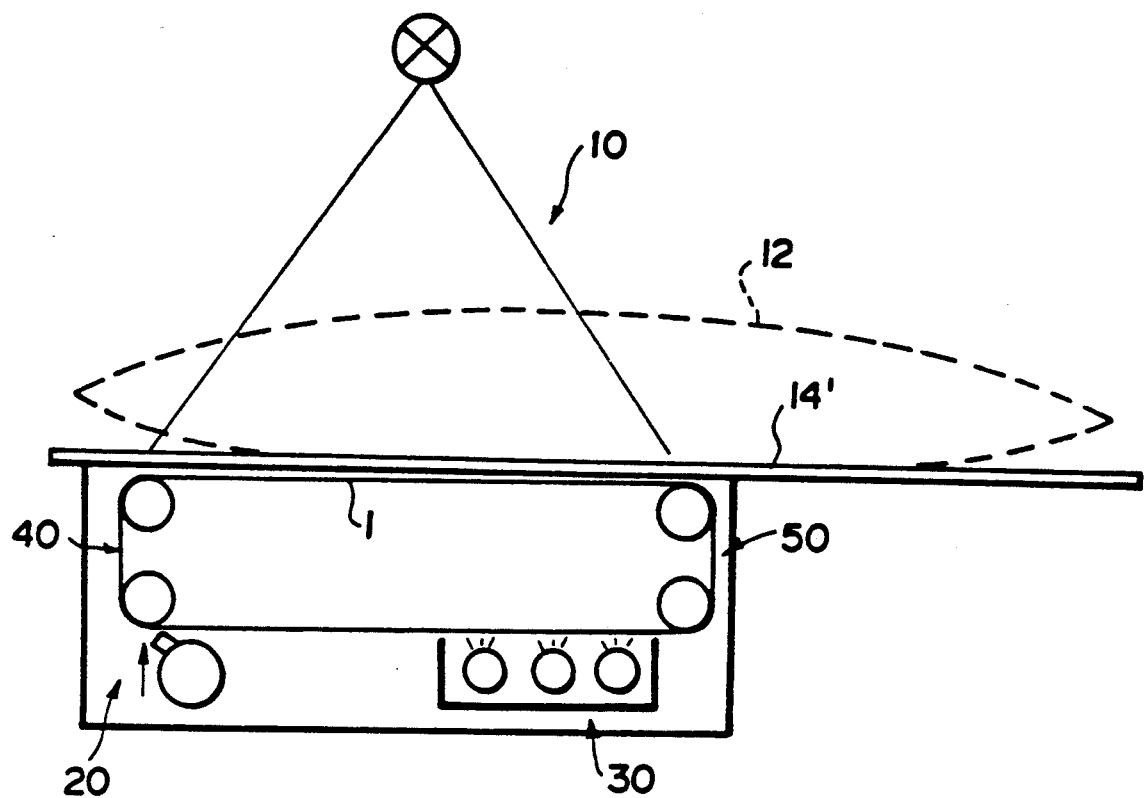
FIG. 7 is a schematic view showing an example of a configuration for the housing.
Figure 8:
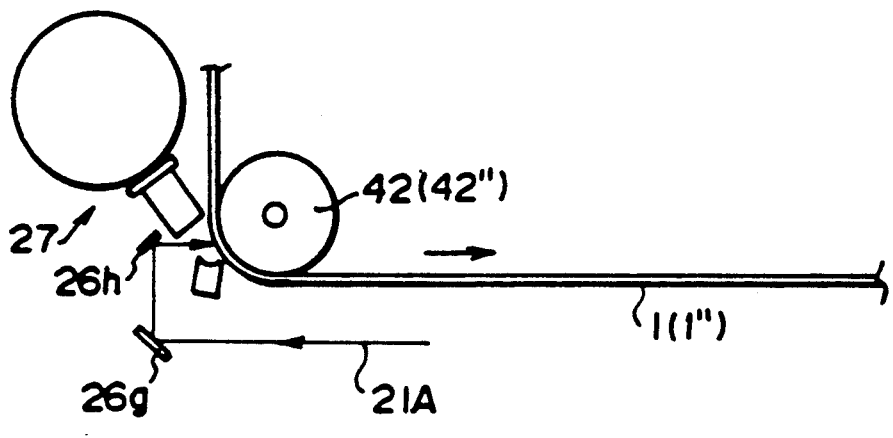
FIG. 8 is a schematic view showing an example of a layout of the image read-out section.
Figure 26:
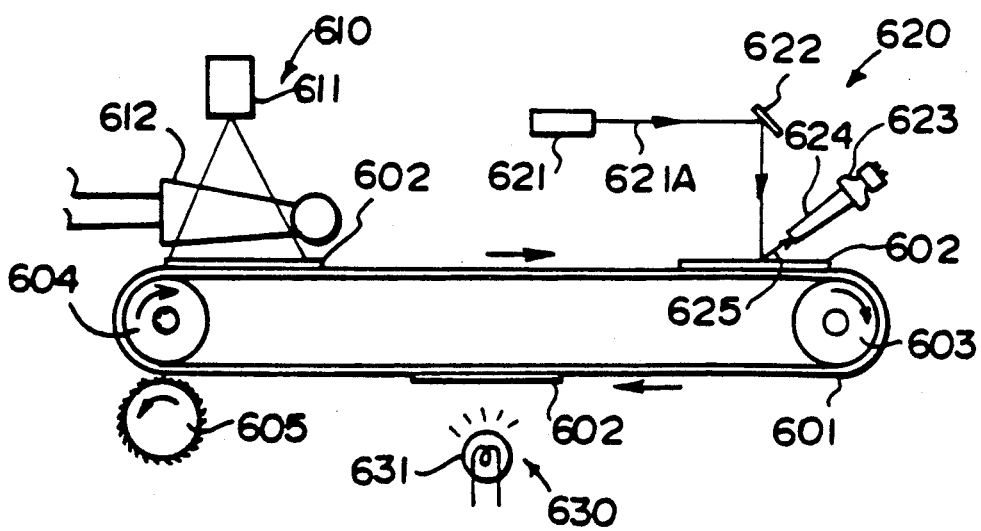
FIG. 26 is a side view showing a conventional radiation image recording and read-out apparatus.

The housing of the apparatus, which contains the recording belt 1, the image read-out section 20, the erasing section 30 and the like, may be made arbitrarily large or small, as long as it can contain the sections and parts necessary to the apparatus. For example, as shown in FIG. 7, the image recording table 14' on the upper surface of the housing may be projected horizontally to provide good support for the object 12. Also, all the parts of the image read-out section need not necessarily be provided so as to face the radiation source. By way of example, as shown in FIG. 8, the scanning position may be on the side rather than on the bottom of roller 42, and some elements of the image read-out section such as the optical path adjusting mirrors 26g and 26h and the photoelectric read-out means 27 may be disposed to the side of the recording belt 1.

Figure 9:
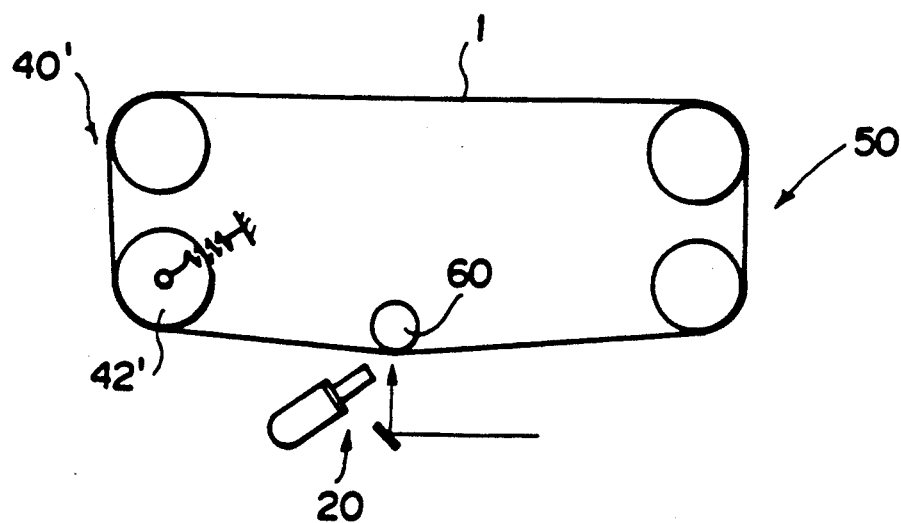
FIG. 9 is a schematic view showing an example of the structure of the group of rollers.

Further, as shown in FIG. 9, the group of rollers may be composed of two sets of roller sections 40' and 50, and other additional rollers (roller 60 in FIG. 9). In such cases, the scanning of the stimulating rays in the image read-out section can be conducted at any of the rollers, for example, at roller 60 as shown in this Figure. However, if the group of rollers includes a tension roller (roller 42' in the first roller section in FIG. 9), scanning should take place at any of the other rollers, not at the tension roller.

As the photoelectric read-out means, the means provided with the long photomultiplier as mentioned above should preferably be used to keep the apparatus small. However, it is also possible to use a known photoelectric read-out means comprising a light guide member having a light input end face extending along the main scanning direction and a cylindrical light output end face, and a comparatively small photomultiplier in close contact with the light output end face of the light guide member.

Figure 10:
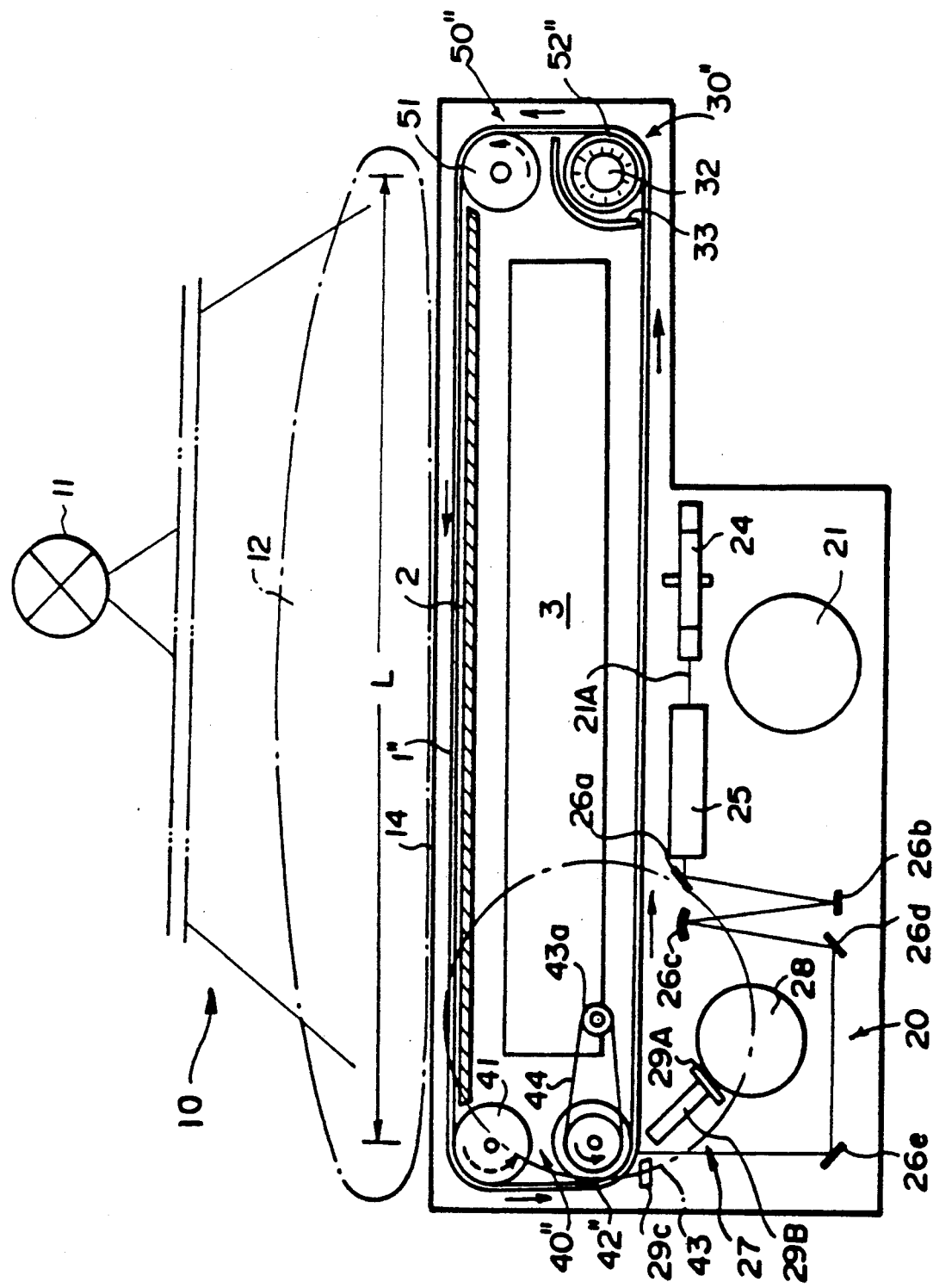
FIG. 10 is a side view showing an embodiment of the second radiation image recording and read-out apparatus in accordance with the present invention.
Figure 11:
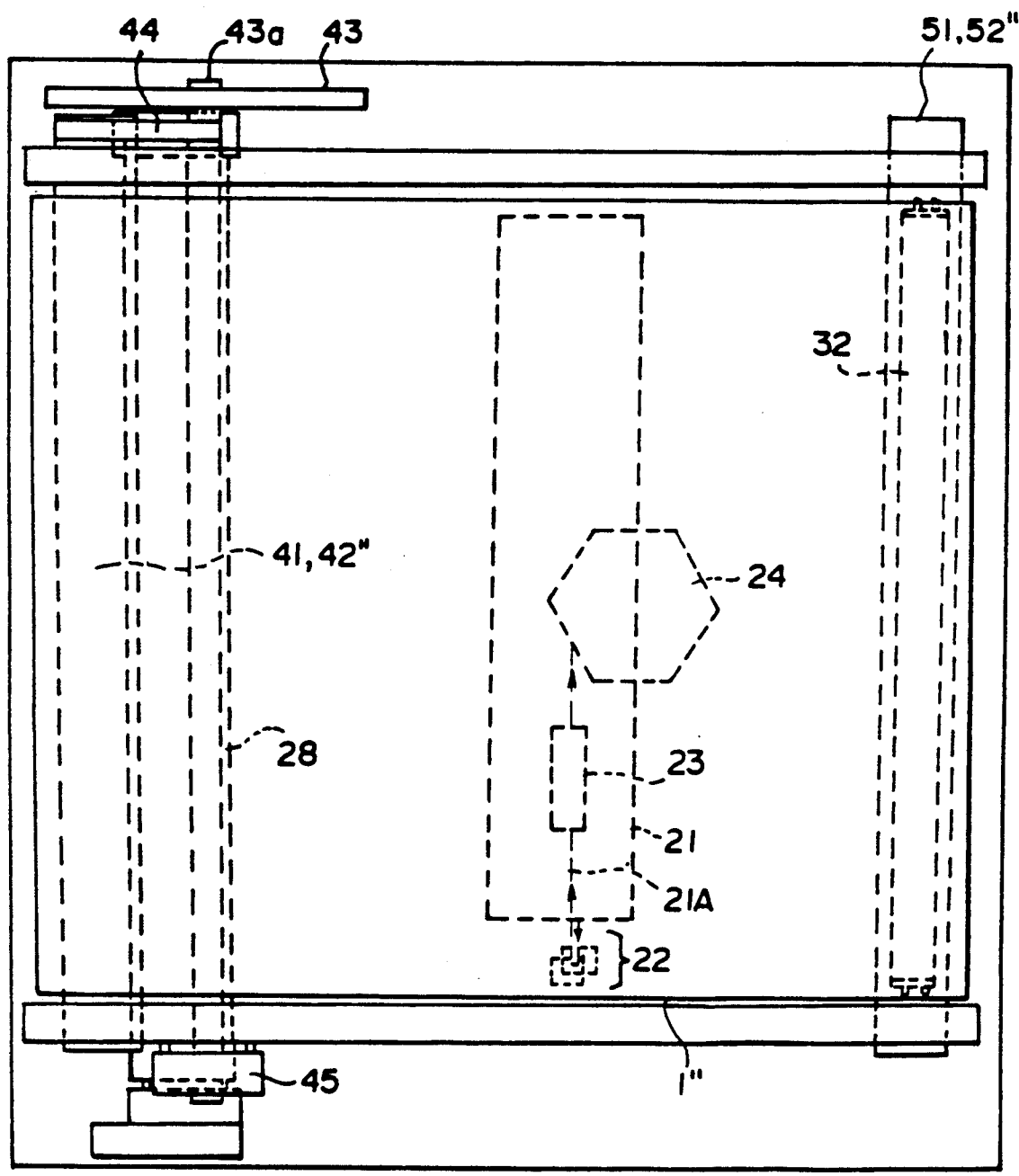
FIG. 11 is a plan view showing the major part of the embodiment shown in FIG. 10.

An embodiment of the second radiation image recording and read-out apparatus in accordance with the present invention will hereinbelow be described with reference to FIGS. 10 and 11. In FIGS. 10 and 11, similar elements are numbered with the same reference numerals with respect to FIGS. 1 and 2.

With reference to FIGS. 10 and 11, a recording belt 1" composed of an endless belt constituted of a transparent supporting material and a stimulable phosphor layer formed over the overall surface of the transparent supporting material is applied around a first roller section 40", constituted of rollers 41 and 42", and a second roller section 50", constituted of rollers 51 and 52" and spaced by a predetermined distance L from the first roller section 40". The recording belt 1" is conveyed and circulated in the direction indicated by the arrow around the first roller section 40" and the second roller section 50". In this embodiment, the group of rollers are composed of these first and second roller sections 40" and 50" alone. The shaft-to-shaft distance L between the first roller section 40" and the second roller section 50" is adjusted to be approximately equal to the length of a single image formed on the recording belt 1".

As long as an image is being recorded, the recording belt 1" is kept stationary at a predetermined recording position so that the portion of the recording belt 1" on which the image is being recorded faces the radiation source 11. When the image recording process is finished, the recording belt 1" is conveyed by the rollers 41, 42", 51 and 52", which rotate in the directions indicated by the arrows, and the portion of the recording belt 1" on which the image has been recorded is conveyed to the image read-out section 20 disposed on the left side of the apparatus below the recording belt 1". Of the rollers 41, 42", 51 and 52", only roller 42" is a drive roller and is connected to a shaft 43a of a motor 43 by a belt or a chain 44. The other rollers 41, 51 and 52" are driven rollers which rotate by the action of the drive roller 42". As shown in FIG. 11, a rotary encoder 45 is secured to the shaft 43a of the motor 43 for detecting the degree of rotation of the motor 43 and carrying out various control operations.

At the image read-out section 20, the stimulating rays 21A repeatedly scan the recording belt 1" on the lower circumferential surface of the roller 42" in the main scanning direction. Simultaneously with the scanning of the stimulating rays 21A in the main scanning direction, the recording belt 1" is conveyed at a predetermined speed by the rollers 41, 42", 51 and 52" in the sub-scanning direction as indicated by the arrow in FIG. 10.

Accordingly, the stimulating rays 21A are irradiated over nearly the overall surface of the recording belt portion carrying the radiation image, which was stored thereon in the image recording section 10.

Figure 12:
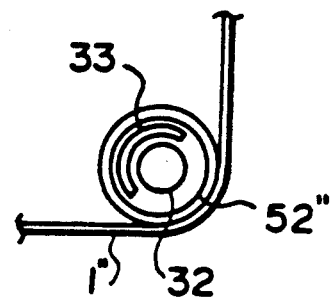
FIG. 12 is a schematic view showing an example of a configuration of the erasing section in the second radiation image recording and read-out apparatus in accordance with the present invention.

The portion of the recording belt 1" from which the image has been read-out is moved by the first roller section 40" and the second roller section 50" to an erasing section 30". The erasing section 30" is provided inside of the loop defined by the recording belt 1". Specifically, the roller 52" is a hollow, transparent roller, and the erasing light source 32 constituted of a fluorescent lamp or the like extending along the width of the recording belt 1" is provided inside the roller 52". The erasing light source 32 mainly produces erasing light having a wavelength within the stimulation wavelength range of the stimulable phosphor layer of the recording belt 1". The erasing light passes through the transparent roller 52" and the transparent supporting material of the recording belt 1", and impinges upon the stimulable phosphor layer. The erasing light is thus irradiated over the overall image forming region of the recording belt 1" while the recording belt 1" is being conveyed, which releases any radiation energy remaining on the stimulable phosphor layer of the recording belt 1" after the image read-out process is finished. A reflection mirror 33 faces the recording belt 1" with the roller 52" intervening therebetween, so that the erasing light which travels away from the recording belt 1" is reflected by the reflection mirror 33 and is efficiently guided onto the recording belt 1". The reflection mirror 33 also shields other elements of the apparatus from the erasing light. As shown in FIG. 12, the reflection mirror 33 may be provided inside the roller 52". The recording belt portion which has been erased in the erasing section 30" is conveyed to the image recording section 10 for reuse in image recording.

With this embodiment wherein the transparent roller 52" is included in the group of rollers and the erasing light source 32 is provided inside the transparent roller 52", the erasing section 30" can be accommodated inside of the loop defined by the recording belt 1", and therefore the apparatus can be made smaller.

Alternatively, a plurality of the rollers may be transparent, and the erasing light sources may be provided inside respective transparent rollers. Further, the predetermined distance between the two sets of roller sections 40" and 50" may be made longer than the distance in this embodiment, but it may not be more than 1.5 times as long as the length of the largest image recordable in the apparatus.

Figure 13:
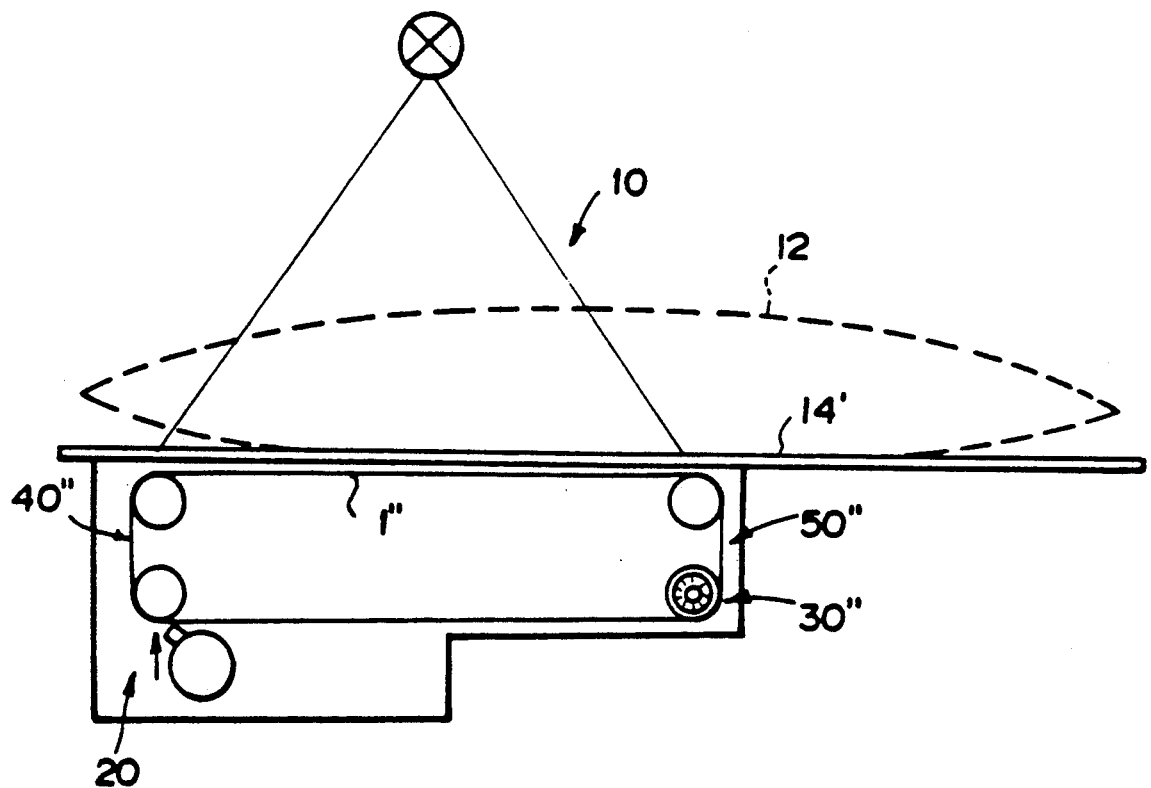
FIG. 13 is a schematic view showing an example of a shape of the housing in the second radiation image recording and read-out apparatus in accordance with the present invention.

The housing of the apparatus, which contains the recording belt 1", the image read-out section 20 and the like, can be made arbitrarily small or large as long as it can contain the sections and parts necessary to the apparatus. For example, as shown in FIG. 13, the image recording table 14' on the upper surface of the housing may be projected horizontally to provide good support for the object 12. Also, all the parts of the image read-out section need not necessarily be provided so as to face the radiation source. By way of example, as shown in FIG. 8, the scanning position may be on the side rather than on the bottom roller 42", and some elements of the image read-out section such as the optical path adjusting mirrors 26g and 26h and the photoelectric read-out means 27 may be disposed to the side of the recording belt 1".

Figure 14:
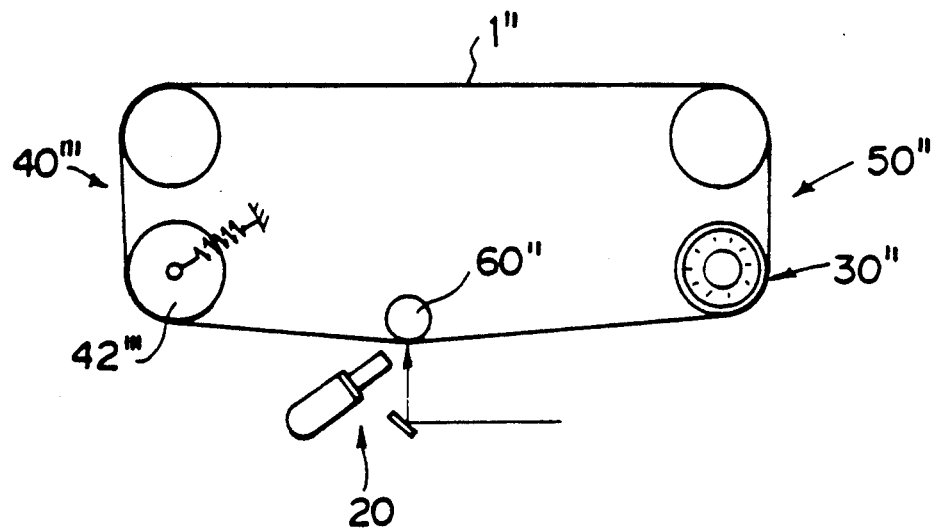
FIG. 14 is a schematic view showing an example of the structure of the group of rollers in the second radiation image recording and read-out apparatus in accordance with the present invention.

Further, as shown in FIG. 14, the group of rollers may be composed of roller sections 40'" and 50", and other additional rollers (roller 60" in FIG. 14). If this is the case, the scanning of the stimulating rays in the image read-out section can be conducted at any of the rollers, for example, at roller 60" as shown in this Figure. Alternatively, the roller 60" may be constituted of a transparent roller, and the erasing light source may be provided inside of roller 60". However, when the group of rollers includes a tension roller (roller 42'" in the first roller section in FIG. 14), scanning should take place at any roller except the tension roller.

An embodiment of the third radiation image recording and read-out apparatus in accordance with the present invention will hereinbelow be described with reference to FIG. 15.

Figure 15:
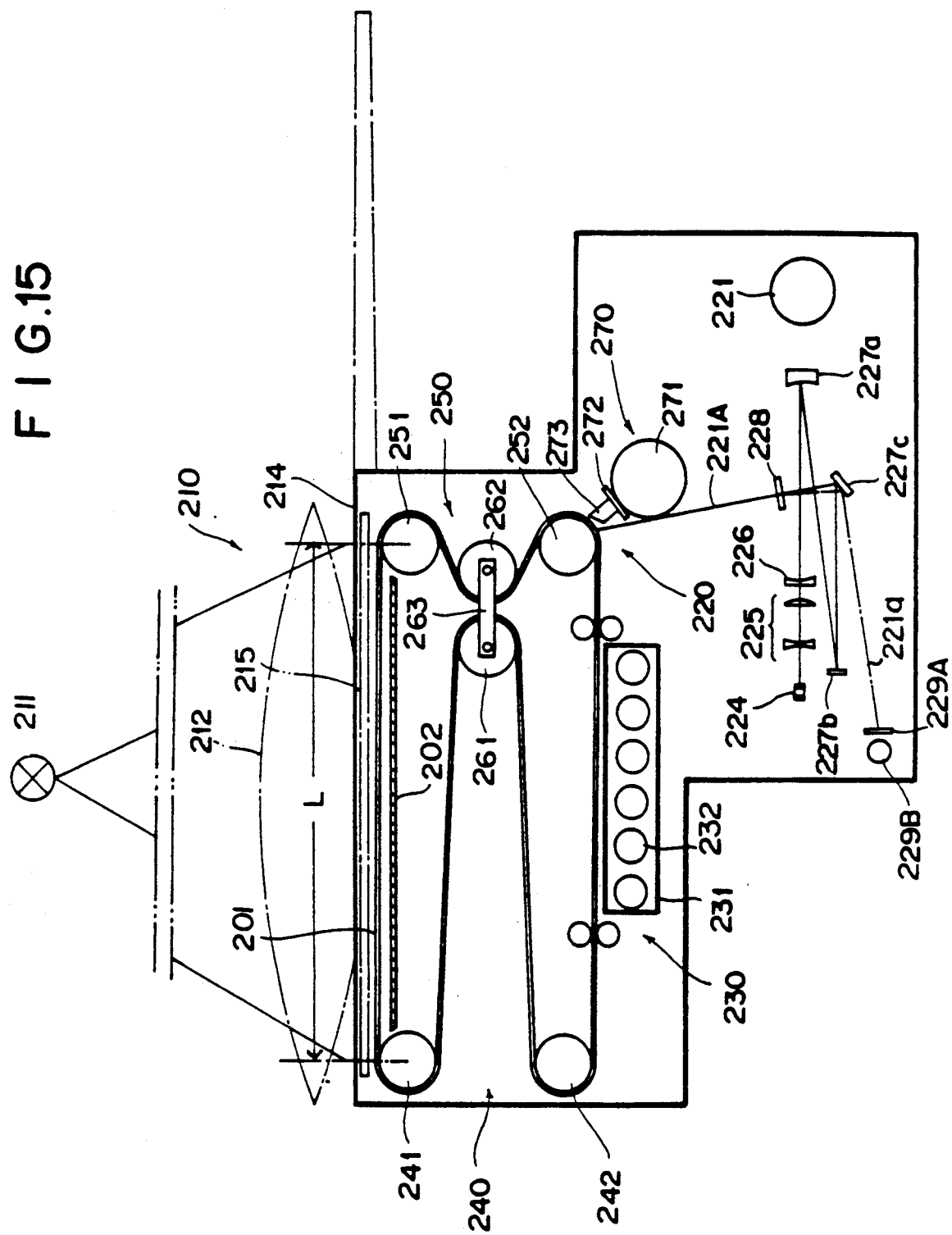
FIG. 15 is a side view showing an embodiment of the third radiation image recording and read-out apparatus in accordance with the present invention.

With reference to FIG. 15, a recording belt 201 composed of an endless belt on which a stimulable phosphor layer is formed on the overall surface is conveyed and circulated around a group of rollers comprising a first roller section 240 and a second roller section 250, the shafts of which roller sections are spaced by a distance L from each other, and idle rollers 261 and 262. The first roller section 240 is composed of an upper roller 241 which constitutes a first roller subsection, and a lower roller 242 which constitutes a second roller subsection. The second roller section 250 is composed of an upper roller 251 which constitutes a first roller subsection, and a lower roller 252 which constitutes a second roller subsection. The idle roller 261 is provided between the upper roller 241 and the lower roller 242, and the recording belt 201 is applied around the idle roller 261. The idle roller 262 is provided between the upper roller 251 and the lower roller 252, and the recording belt 201 is applied around the idle roller 262. In this embodiment, the idle rollers 261 and 262 respectively constitute an idle roller section. The idle rollers 261 and 262 are connected together by a connection means 263, and may be moved horizontally in FIG. 15 by a movement means (not shown).

A radiation source 211 constituted of an X-ray source or the like is disposed above and facing the recording belt 201. An upper region of the apparatus including the radiation source 211 and an image recording table 214 on which an object 212 is to be placed constitutes an image recording section 210.

In the image recording section 210, when the radiation source 211 is activated, it produces radiation which passes through the object 212 placed on the image recording table 214, and therefore a radiation image of the object 212 is projected onto the recording belt 201. In this manner, a radiation image of the object 212 is stored on the stimulable phosphor layer of the recording belt 201. The shaft-to-shaft distance L between the first roller section 240 and the second roller section 250 is adjusted to be approximately equal to the length of the single largest image which may be recorded at the image recording section 210. Therefore, the aforesaid radiation image is stored over part or nearly the overall area of the upper side portion of the recording belt 201. Also, a grid device 215 which may be a bucky device or the like is often provided between the image recording table 214 and the recording belt 201, depending on the portion of the object, an image of which is to be recorded. Specifically, in the case where an image of a thick portion of an object such as the chest of a person is to be recorded, the radiation scattered by the object often causes the image quality to deteriorate. Therefore, in such cases, a grid device having a grid for absorbing the scattered radiation, or a bucky device provided with the grid and a means for reciprocally moving the grid should be disposed between the object and the recording belt. As will be described later, image recording and image read-out may be simultaneously carried out in this embodiment. Therefore, in cases where the bucky device, wherein the grid is moved, is provided, it is necessary for the movement of the bucky device to be controlled by designing a means using a spring to move the grid or by controlling the speed of rotation of a motor so that no vibration from the movement of the bucky device affects the image read-out section during image read-out.

As long as image recording is being carried out, the portion of the recording belt 201 present inside the image recording section 210 is kept stationary and faces the radiation source 211. After the image has been recorded, said portion of the recording belt 201 is conveyed by the two sets of roller sections 240 and 250 and the like into an image read-out section 220 disposed below the lower roller 252. The image read-out section 220 will hereinbelow be described with reference to FIGS. 15 and 16.

At the image read-out section 220, a stimulating ray source 221 constituted of an He-Ne laser or the like for producing stimulating rays 221A extends normal to the direction of conveyance of the recording belt 201. Also, a rotating polygon mirror 224, serving as a light deflector, causes the stimulating rays 221A to scan across the width of the recording belt 201. Scanning across the width of the recording belt 201 is defined as scanning in the main scanning direction. The stimulating rays 221A travel normal to the sheet of FIG. 15. The rotating polygon mirror 224 is provided in the optical path of the stimulating rays 221A. As shown in FIG. 16, the direction of travel of the stimulating rays 221A when leaving the stimulating ray source 221 is changed by a mirror 222, and the stimulating rays 221A pass through a light input optical system 223 provided with a beam expander, a cylindrical lens or the like, and then impinge upon the rotating polygon mirror 224. The stimulating rays 221A reflected and deflected by the rotating polygon mirror 224 pass through a scanning optical system 225, which is composed of an fθ lens or the like, and then through a cylindrical lens 226. The direction of travel of the stimulating rays 221A is changed by a cylindrical mirror 227a and reflection mirrors 227b and 227c, and then the stimulating rays 221A repeatedly scan the recording belt 201 on the lower circumferential surface of the roller 252 in the main scanning direction. The cylindrical lens 226 and the cylindrical mirror 227a are optical elements for refracting the stimulating rays 221A only in a plane parallel to the sheet of FIG. 15. In the aforesaid optical system, these optical elements and the cylindrical lens in the aforesaid light input optical system 223 prevent pitch nonuniformity in the scanning lines from arising on the recording belt 201 even should the axis, mirror surface inclination or the like of the rotating polygon mirror 224 deviate. Furthermore, a beam splitter 228 which transmits most of the incident stimulating rays 221A and reflects the remainder thereof is provided between the reflection mirror 227c and the positions being scanned on the recording belt 201. The stimulating rays 221A which pass through the beam splitter 228 are utilized for scanning the recording belt 201. On the other hand, the stimulating rays 221a reflected by the beam splitter 228 impinge upon a grid 229A which extends in the direction in which the stimulating rays 221A scan and which is composed of light regions and dark regions provided alternately. The stimulating rays 221a passing through the grid 229A are guided by a light guide rod 229B positioned at the rear of the grid 229A, and are detected by a photodetector 229C. In this manner, a synchronizing signal representing the scanning position of the stimulating rays 221A is obtained. Simultaneously with the scanning of the stimulating rays 221A in the main scanning direction, the recording belt 201 is conveyed at a predetermined speed in the sub-scanning direction, i.e. leftward in the image read-out section 220 in FIG. 15. Accordingly, the stimulating rays 221A are irradiated over nearly the overall surface of the recording belt portion carrying the radiation image, which was stored thereon in the image recording section 210.

As the recording belt 201 is exposed to the stimulating rays 221A, the exposed part of the recording belt 201 emits light in proportion to the stored radiation energy, and the emitted light is detected by a photoelectric read-out means 270. In this embodiment, the photoelectric read-out means 270 comprises a long photomultiplier 271 which extends in the main scanning direction at least over the length of the main scanning line and has a light receiving face positioned so as to face the main scanning line as disclosed in U.S. patent application Ser. No. 141,259, a filter 272 in close contact with the light receiving face of the photomultiplier 271 for selectively transmitting only the light emitted by the recording belt 201 and filtering out the stimulating rays 221A reflected by the surface of the recording belt 201 to the photomultiplier 271, and a light guide member 273 in close contact with the filter 272 for substantially guiding the light emitted by the recording belt 201 to the photomultiplier 271. The light emitted by the position being scanned by the stimulating rays 221A impinges upon the photomultiplier 271 via the light guide member 273 and the filter 272, and is photoelectrically converted by the photomultiplier 271 into electric an image signal. The image signal is subjected to any necessary image processing, and fed to an image reproducing apparatus, for example, a display device such as a CRT or a recording apparatus for carrying out light beam scanning recording on a photosensitive film.

As for the radiation image read-out process, there has heretofore been known a method wherein a preliminary read-out for approximately ascertaining the radiation image stored on the recording belt 201 is carried out prior to the aforesaid image read-out (final read-out) for obtaining an electric image signal used to reproduce a visible image. The image read-out conditions for the final read-out or the like are based on the information obtained by the preliminary read-out.

As disclosed in, for example, U.S. Pat. No. 4,527,060, the preliminary read-out may be conducted by scanning the recording belt 201 with stimulating rays having a lower stimulation energy than the stimulation energy of the stimulating rays used in the final read-out, and detecting the light emitted by the recording belt 201 in the course of the scanning with a photoelectric read-out means.

The image read-out section 220 is constituted in such a way that both the preliminary read-out and the final read-out can be carried out. The preliminary read-out is carried out by conveying the portion of the recording belt 201, on which the image has been stored, leftward in the image read-out section 220. The necessary rollers are then rotated in the reverse direction in order to return said portion of the recording belt 201 to the read-out start position. Final read-out is then carried out while said portion of the recording belt 201 is again conveyed leftward. During the preliminary read-out, the recording belt 201 is conveyed at a higher speed than during the final read-out.

The portion of the recording belt 201 from which the image has been read-out is moved by the first roller section 240 and the second roller section 250 to an erasing section 230. The erasing section 230 comprises a case 231, and a plurality of (by way of example, six) erasing light sources 232, 232, . . . constituted of fluorescent lamps or the like and disposed in the case 231. The erasing light sources 232, 232, . . . produce erasing light having a wavelength mainly within the stimulation wavelength range of the stimulable phosphor layer of the recording belt 201. The erasing light is irradiated over the overall image forming area of the recording belt 201 while the recording belt 201 is being conveyed, which releases any radiation energy remaining on the stimulable phosphor layer of the recording belt 201 after the image read-out process is finished. A lead plate 202 for blocking the radiation is provided below the image recording table 214 so that the radiation produced by the radiation source 211 at the time the image is recorded does not adversely affect the image read-out section 220, the erasing section 230, or the recording belt 201 positioned therein. In this embodiment the recording belt portion which has been erased in the erasing section 230 is conveyed to the image recording section 210 for reuse in recording another image.

With this embodiment wherein the idle rollers 261 and 262 are moved together and horizontally so that the lengths of conveyance of the recording belt 201 on the upstream and downstream sides of the image recording section 210 are changed, a plurality of image recording steps can be carried out efficiently. Relationships between the movement of the idle rollers 261 and 262 and the operation of elements of the apparatus will hereinbelow be described with reference to FIGS. 17A through 17G.

Figure 17A:
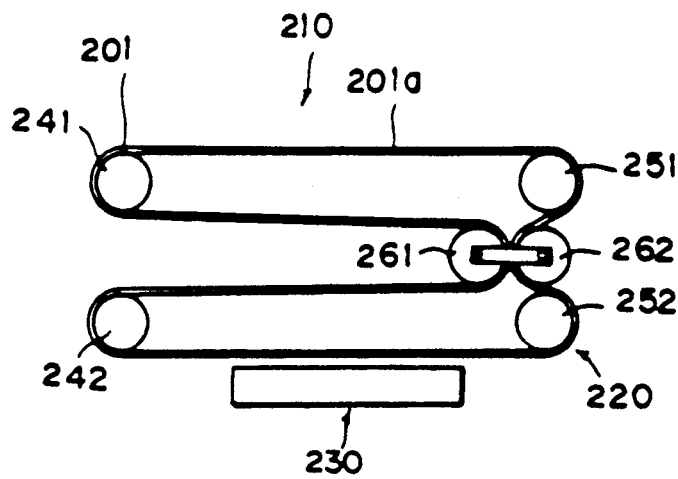

With reference to FIG. 17A, when the operation of the apparatus begins, the idle rollers 261 and 262 are moved to the extreme right of their movement range, and recording of a first image is carried out on the upper surface of the recording belt 201. FIGS. 17A through 17G illustrated the recording of a comparatively small-sized image. Therefore, when recording the first image, the hatched portion 201a in FIG. 17A is exposed to radiation.

Figure 17B:
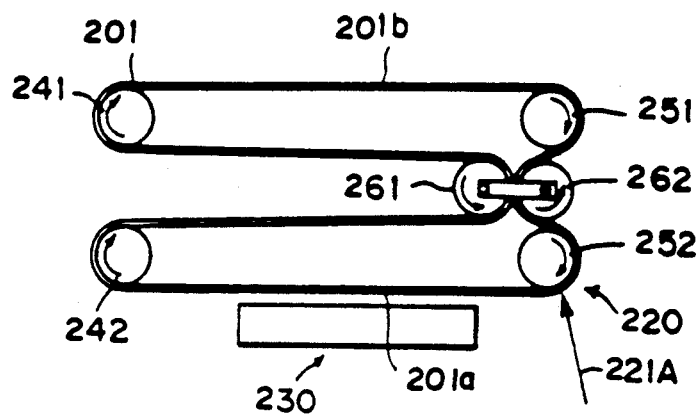

When the recording of the first image has been completed, the respective rollers rotate and move the portion 201a into the image read-out section 220 for carrying out the preliminary read-out. As shown in FIG. 17B, at the time the preliminary read-out from the portion 201a is completed, a portion 201b is located at the image recording position, and the recording of a second image is carried out on the portion 201b. During the preliminary read-out, the erasing light sources in the erasing section 230 are kept off. Also, as mentioned above, the preliminary read-out is carried out while the recording belt 201 is being conveyed at a comparatively high speed. Therefore, recording of the second image can be carried out within a comparatively short time interval after the first image has been recorded.

Figure 17C:
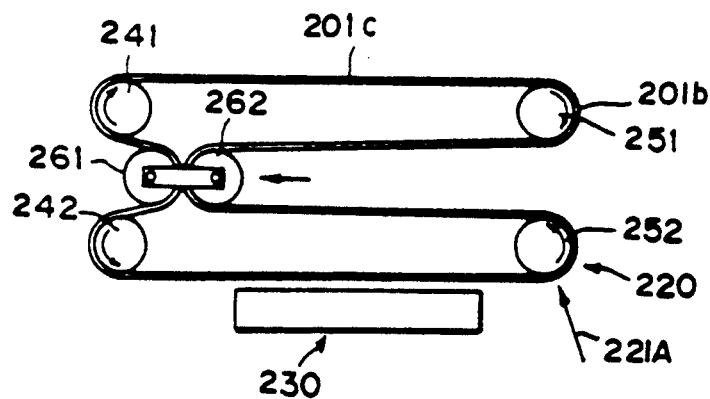

As shown in FIG. 17C, when the recording of the second image is completed, the idle rollers 261 and 262 are moved leftward so that the recording belt 201 is conveyed and the portion 201a is returned to a read-out start position. Also, a new portion 201c is located at the image recording position. Therefore, recording of a third image is carried out on the portion 201c in the image recording section 210.

Figure 17D:
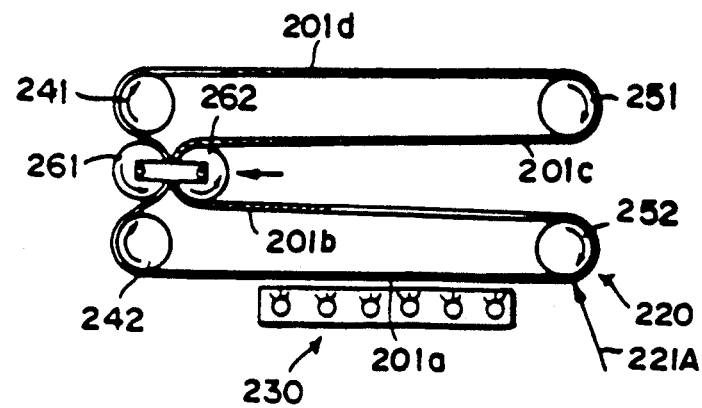

Thereafter, the respective rollers are rotated in the directions shown in FIG. 17D, and the final read-out of the portion 201a is carried out in the image read-out section 220. The upper rollers 241 and 251 are rotated slightly more quickly than the other rollers, while the idle rollers 261 and 262 are moved to the extreme left of their movement range. As a result, a new recording belt portion is efficiently fed to the image recording position. Therefore, when the final read-out from the portion 201a has advanced to the position shown in FIG. 17D, a new portion 201d which is usable for image recording and which is adjacent the portion 201c is located at the image recording position. The recording of a fourth image is carried out on the portion 201d.

Figure 17E:
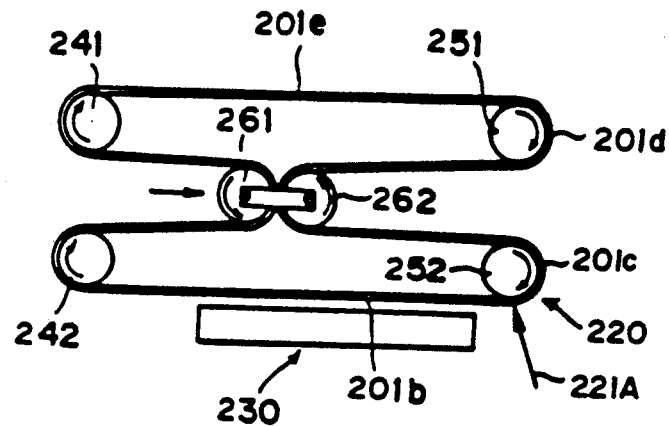
Figure 17F:
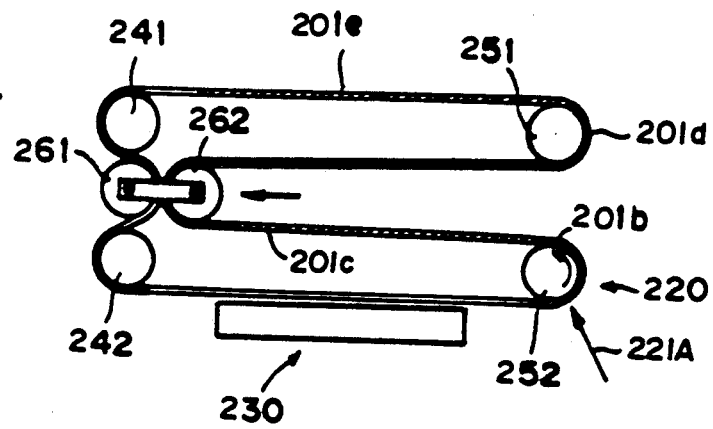

The recording of a fifth image becomes possible when the final read-out from portion 201a and the preliminary read-out from portion 201b are completed. Since a margin is present between the portions 201a and 201b, the recording belt 201 must move further than the length of a single image between the completion of the final read-out from the portion 201a and the completion of the preliminary read-out from the portion 201b. Therefore, as shown in FIG. 17E, the idle rollers 261 and 262 are moved rightward prior to the completion of the preliminary read-out from the portion 201b so that a portion 201e on which the recording of a fifth image is to be effected is adjacent the portion 201d. When the preliminary read-out from the portion 201b is completed, the idle rollers 261 and 262 are moved to the extreme left of their movement range as shown in FIG. 17F so that the portion 201b is returned to the read-out start position. At this time, the portion 201e is kept stationary at the image recording position. Therefore, the recording of the fifth image may be carried out at any time between the states of the recording belt shown in FIGS. 17E and 17F.

Figure 17G:
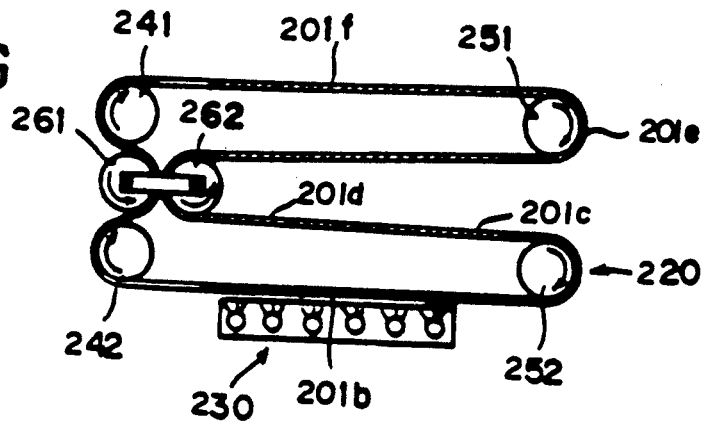

As shown in FIG. 17G, recording of a sixth image on a portion 201f adjacent the portion 201e can be carried out when the final read-out from the portion 201b is completed. The portion 201f is kept stationary at the image recording position for the time between when the final read-out from the portion 201b is completed and the preliminary read-out is carried out for the portion 201c and when the portion 201c is returned to the read-out start position for final read-out. Therefore, the recording of a sixth image on the portion 201f may be effected at any instance during said time.

The operation of elements of the apparatus in cases where an image having the maximum size, i.e., a length equal to the shaft-to-shaft distance between the upper rollers 241 and 251, is to be recorded will hereinbelow be described with reference to FIGS. 18A through 18H.

Figure 18A:
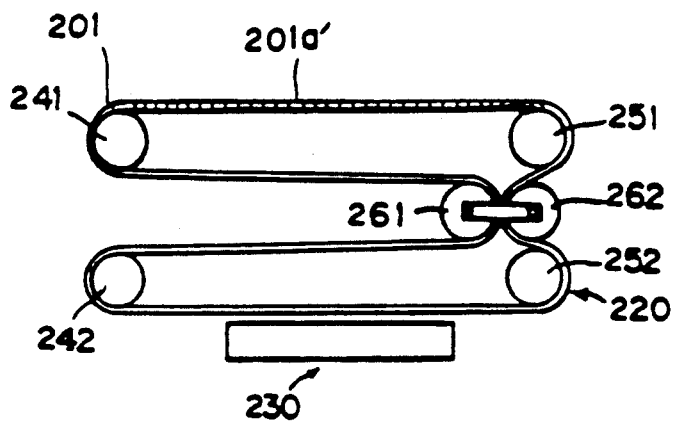
Figure 18B:
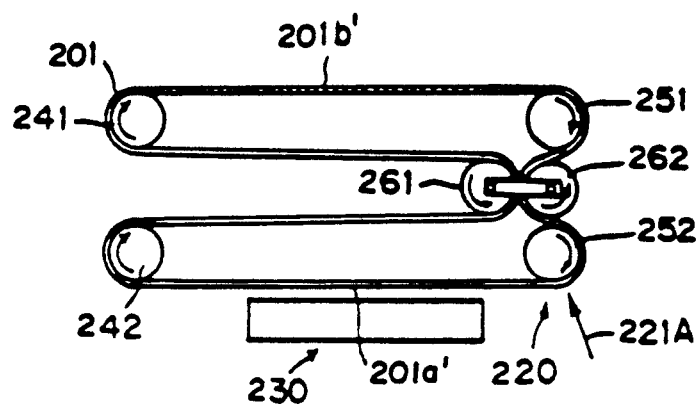
Figure 18C:
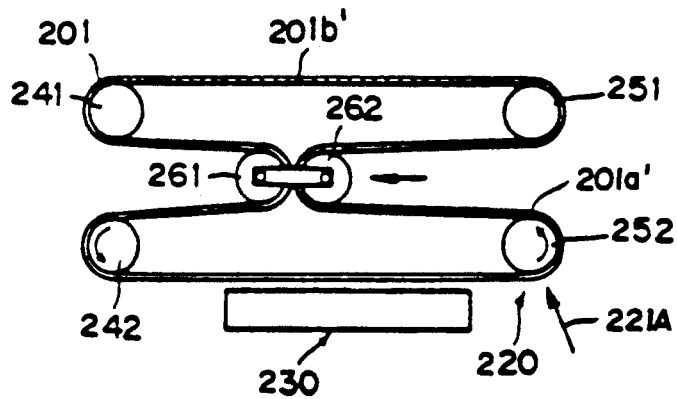

With reference to FIG. 18A, when the operation of the apparatus is begun, the idle rollers 261 and 262 are moved to the extreme right of their movement range, and the recording of a first image is carried out on an overall area (a portion 201a') of the upper surface of the recording belt 201. When the recording of the first image has been completed, the respective rollers are rotated without changing their positions. As shown in FIG. 18B, the recording belt is conveyed until the preliminary read-out from the portion 201a' is completed. At this time, a portion 201b' is located at the image recording position, and the recording of a second image on the portion 201b' becomes possible. Thereafter, as shown in FIG. 18C, the idle rollers 261 and 262 are moved leftward so that the portion 201a' is returned to the read-out start position. The image recording on the portion 201b' may be carried out during the time when the preliminary read-out from the portion 201a' is completed and the portion 201a' on which the preliminary read-out has been completed is returned to the read-out start position for final read-out. In this manner, the operation cycle time can be made as short as possible.

Figure 18D:
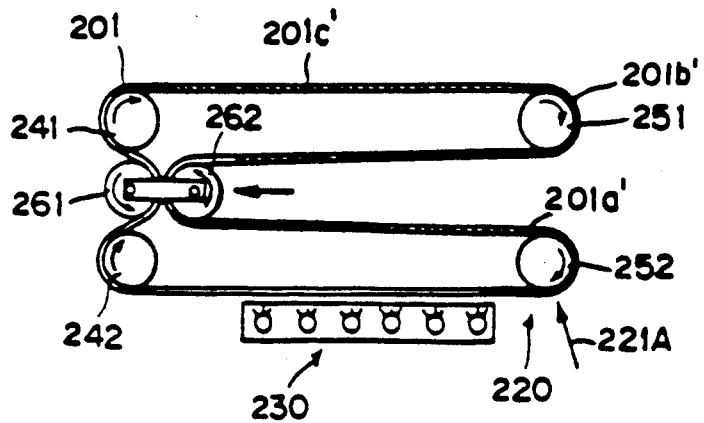
Figure 18E:
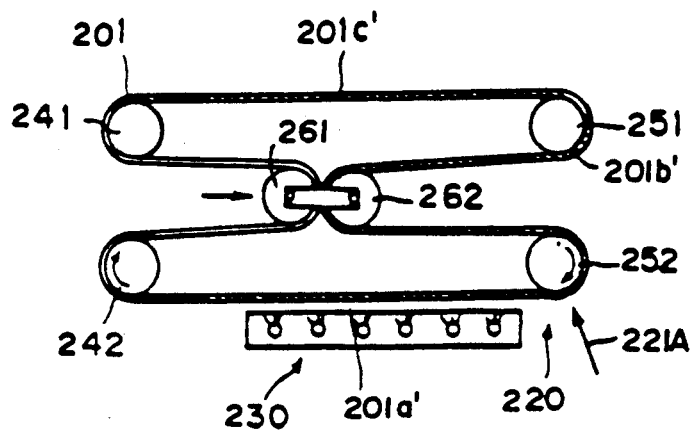

Thereafter, the respective rollers are rotated in the directions shown in FIG. 18D so that the recording belt 201 is conveyed at a predetermined speed, and the final read-out of the portion 201a' is carried out in the image read-out section 220. The upper rollers 241 and 251 are rotated more quickly than the other rollers, while the idle rollers 261 and 262 are moved to the extreme left of their movement range. As a result, a portion 201c ' adjacent to the portion 201b' is efficiently fed to the image recording position. When the final read-out from the portion 201a' has advanced to the position shown in FIG. 18D, the portion 201c ' is located at the image recording position. Thereafter, as shown in FIG. 18E, as the lower roller 252 is rotated, the idle rollers 261 and 262 are moved gradually rightward, and the final read-out from the portion 201a' is completed. Therefore, the recording of a third image on the portion 201c ' should preferably be carried out between the states of the recording belt shown in FIGS. 18D and 18E.

Figure 18F:
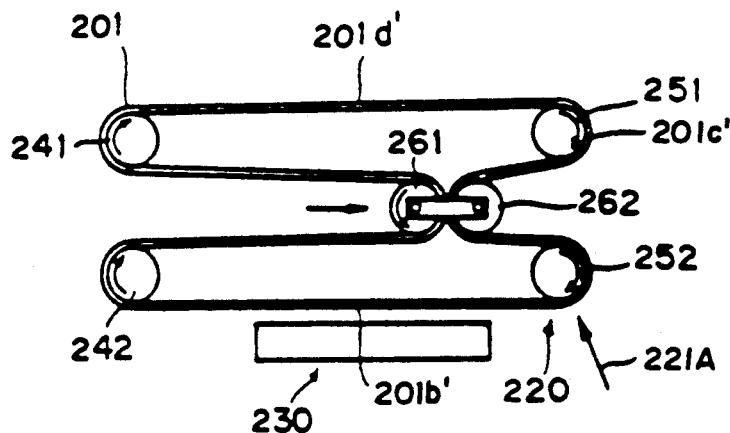
Figure 18G:
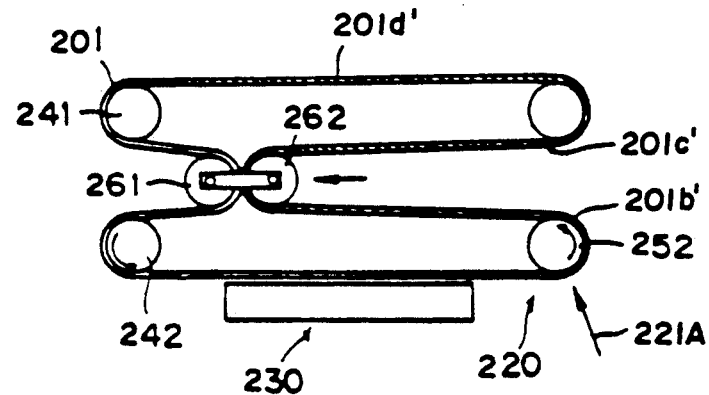

As shown in FIG. 18F, the recording of a fourth image on a portion 201d' adjacent to the portion 201c ' becomes possible when the preliminary read-out from the portion 201b' is completed. At this time, the idle rollers 261 and 262 are moved slightly rightward in order to adjust the feed lengths of the portions 201b' and 201d'. Also, as shown in FIG. 18G, the portion 201b' on which the preliminary read-out has been completed is returned to the read-out start position by the leftward movement of the idle rollers 261 and 262. Therefore, image recording on the portion 201d' should preferably be carried out between the states of the recording belt shown in FIGS. 18F and 18G.

Figure 18H:
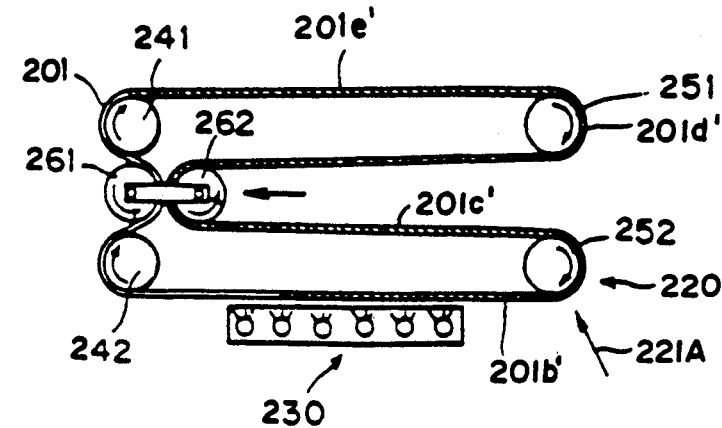

Thereafter, the final read-out from the portion 201b' is carried out in the image read-out section 220. Also, the upper rollers 241 and 251 are rotated more quickly than the other rollers, and the idle rollers 261 and 262 are moved to the extreme left of their movement range, so that a portion 201e' adjacent to the portion 201d' is quickly fed to the image recording position as shown in FIG. 18H. As the final read-out from the portion 201b' advances, the idle rollers 261 and 262 start moving rightward. The recording of a fifth image becomes possible with the recording belt in this state.

With the embodiment shown in FIG. 15 wherein the idle rollers 261 and 262 are provided between the upper rollers 241, 251 and the lower rollers 242, 252, the lengths of conveyance on the upstream and downstream sides of the image recording section 210 can be changed so that image recording and image read-out may be carried out simultaneously. Accordingly, a plurality of image recording steps can be carried out efficiently.

The shaft-to-shaft distance L between the two sets of roller sections 240 and 250 may be made longer than the distance in the embodiment shown in FIG. 15, but it may not be more than 1.5 times as long as the length of the largest image recordable in the apparatus. Also, the configurations of the other parts of the apparatus are not limited to those described in the aforesaid embodiment. For example, each of the two roller subsections of each roller section may be composed of a plurality of rollers. The two idle roller sections need not necessarily be moved together. Moreover, as shown in FIG. 19 by way of example, each of the two idle roller sections may be provided with a plurality of rollers.

Figure 19:
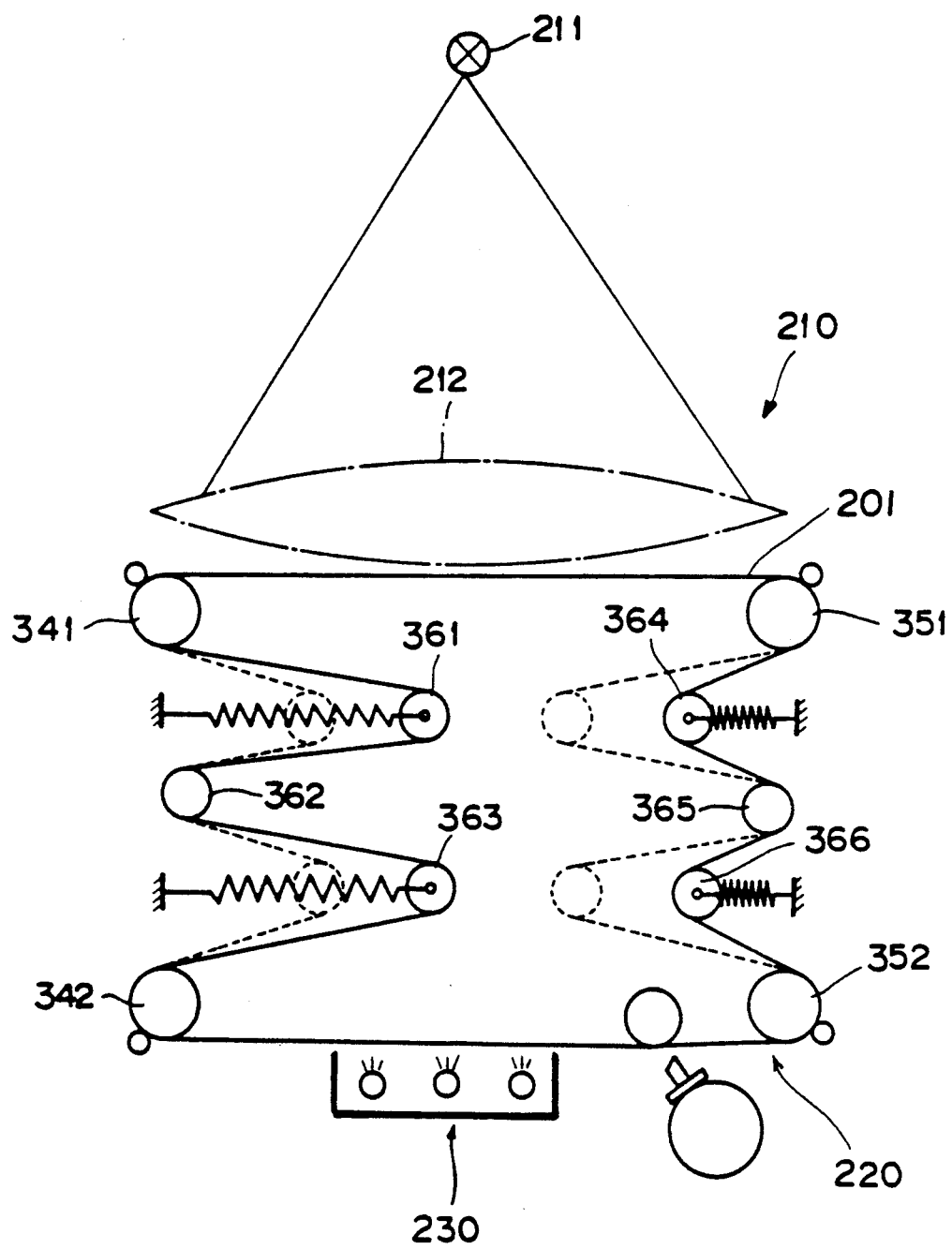
FIG. 19 is a schematic view showing the major part of another embodiment of the third radiation image recording and read-out apparatus in accordance with the present invention.

With reference to FIG. 19, a first idle roller section is composed of two tension rollers 361, 363 and a single fixed roller 362. A second idle roller section is composed of two tension rollers 364, 366 and a single fixed roller 365. Each of the tension rollers 362, 363, 364 and 366 is urged by an urging means such as a spring in a direction that puts tension on the recording belt 201 and may rotate freely like the rollers 362 and 365. The upper rollers 341 and 351 do not rotate during the recording of an image. When the recording belt 201 is to be moved to record a next image, the upper rollers 341 and 351 are rotated clockwise so that the length of conveyance of the recording belt 201 between the upper roller 341 and the lower roller 342 is shortened. The change in the length of conveyance is accommodated by automatically increasing the length of conveyance of the recording belt 201 between the upper roller 351 and the lower roller 352.

On the other hand, when image read-out is to be carried out in the image read-out section 220, the lower rollers 342 and 352 are rotated clockwise at predetermined speeds so that the length of conveyance of the recording belt 201 between the upper roller 351 and the lower roller 352 is decreased gradually and the length of conveyance of the recording belt 201 between the upper roller 341 and the lower roller 342 is increased gradually. In the embodiment shown in FIG. 19, the movement of the recording belt 201 for image recording and the movement of the recording belt 201 for image read-out are accommodated by changes in the lengths of conveyance of the recording belt 201 at the two idle roller sections so that both movements do not adversely affect each other when the movements are within predetermined ranges. Therefore, the recording belt 201 can be moved as desired in the image recording section 210 and the image read-out section 220, and image recording and image read-out can be carried out simultaneously.

A housing of the apparatus, which contains the recording belt 201, the image read-out section 220, the erasing section 230 and the like, may be made arbitrarily large or small, as long as it can contain the sections and parts necessary to the apparatus. For example, as shown in FIG. 15, the image recording table 214 on the upper surface of the housing may project horizontally as indicated by the chain line to provide good support for the object 212. Also, the group of rollers may be composed of the two sets of the roller sections 240 and 250, the idle roller sections, and other additional rollers. If this is the case, the stimulating rays 221A may scan at any roller that is not part of the idle roller sections and that is present on the downstream side of the image recording section 210 as viewed in the direction of conveyance of the recording belt 201.

An embodiment of the fourth radiation image recording and read-out apparatus in accordance with the present invention will hereinbelow be described with reference to FIGS. 20 and 21. In FIG. 20, similar elements are numbered with the same reference numerals with respect to FIG. 15.

With reference to FIGS. 20 and 21, the recording belt 201, composed of an endless belt on which a stimulable phosphor layer is formed on the overall surface, is applied around a first roller section 440 constituted of rollers 441 and 442, and a second roller section 450 constituted of rollers 451 and 452, which second roller section 450 is spaced by a shaft-to-shaft distance L from the first roller section 440. The recording belt 201 is conveyed and circulated in the direction indicated by the arrows around the first roller section 440 and the second roller section 450. In this embodiment, the group of rollers are composed of the first and second roller sections 440 and 450, nip rollers 461 and 462, and a roller 464.

In this embodiment, the image recording section 210 can record large-, medium- and small-sized images as will be described later. The shaft-to-shaft distance L between the first roller section 440 and the second roller section 450 is adjusted to be approximately equal to the length of the single largest image recordable in the apparatus.

The radiation source 211 irradiates radiation onto the overall portion of the recording belt 201 present between the first roller section 440 and the second roller section 450, regardless of the size of the image which is to be recorded in the image recording section 210. In this embodiment, in order to prevent radiation from being irradiated onto unnecessary portions of the recording belt 201 when a medium- or small-sized image is to be recorded, radiation blocking shutters 481, 481 are provided between the image recording table 214 and the recording belt 201.

The radiation blocking shutters (hereinafter simply referred to as shutters) 481, 481 are provided at both extremities of the image recording section 210 as viewed in the direction of conveyance of the recording belt 201. The shutters 481, 481 are flexible and imparted with radiation blocking properties by being provided with lead foil or the like. As shown in FIG. 21, chains 481a, 481a are provided at side edges of each shutter 481, and are engaged with sprocket wheels 482, 482. As the sprocket wheels 482, 482 are rotated, the shutter 481 is moved along guide plates 483, 483 between closed positions, at which the shutter 481 covers an edge portion of the recording belt 201 in the image recording section 210, and an open position at which the shutter 481 is retracted from above the recording belt 201 so that the overall portion of the recording belt 201 in the image recording section 210 is laid bare. Specifically, the shutter 481 is moved to its open position when a large-sized image is to be recorded, and is moved to a closed position when a medium- or small-sized image is to be recorded. The shutter 481 has two closed positions for recording of medium-sized images and for the recording of small-sized images. Also, as shown in FIG. 20, a selection means 484 for selecting the size of the image which is to be recorded is provided on a front surface of the apparatus. With a pushbutton 484a large-sized images may be selected, with a pushbutton 484b medium-sized images may be selected, and with a pushbutton 484c small-sized images may be selected for image recording. The sprocket wheels engaged with the shutters 481, 481 are rotated a predetermined number of turns in accordance with the selection of the pushbutton 484a, 484b or 484c. FIGS. 22A, 22B and 22C respectively show the positions of the shutters 481, 481 when large-sized images, medium-sized images and small-sized images are to be recorded. The positions of the shutters 481, 481 cannot be viewed directly from outside the apparatus. Therefore, as shown in FIGS. 22A, 22B and 22C, indicators 485a, 485b, 485c, 485d, 485e and 485f constituted of light emitting elements are provided on the image recording table 214. When the pushbutton 484a is depressed, the indicators 485a and 485f are activated to produce light and indicate the size of the image to be recorded (FIG. 22A). When the pushbutton 484b is depressed, the indicators 485b and 485e are activated to produce light and indicate the size of the image to be recorded (FIG. 22B). When the pushbutton 484c is depressed, the indicators 485c and 485d are activated to produce light and indicate the size of the image to be recorded (FIG. 22C). By providing the shutters 481, 481, which are moveable in accordance with the size of the image which is to be recorded, radiation can be prevented from impinging upon an area of the recording belt 201 outside an image recording area.

Figure 23A:
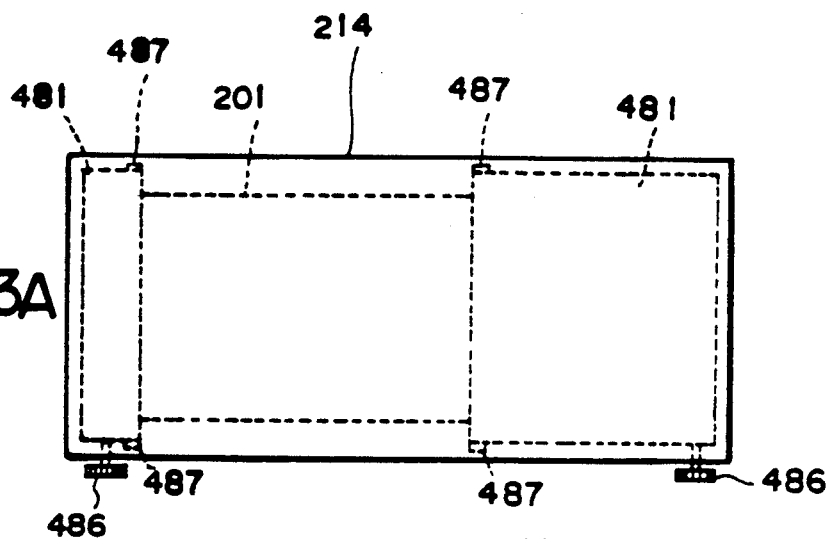
Figure 23B:
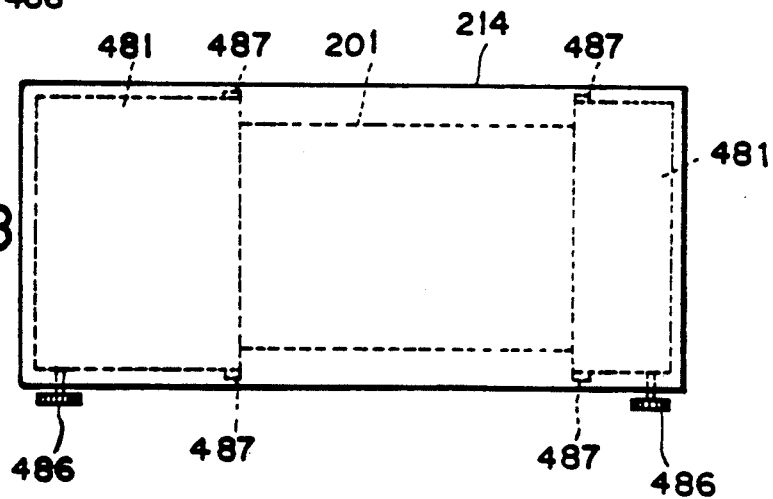

The shutter 481 may be provided on only one side of the image recording section 210. In such cases, small-sized image recording is carried out at an edge portion of the image recording table 214, instead of at the middle portion of the image recording table 214. Also, as shown in FIGS. 23A and 23B, the shutters 481, 481 may be provided with operating means 486, 486 for manually rotating the sprocket wheels, and may be moved independently of each other. If this is the case, a continuous range of image sizes can be recorded. Moreover, for the same image size, the position at which an image is recorded can be changed in accordance with the portion of the object or the like to be recorded. Indicators 487, 487, . . . for detecting and indicating the positions of the shutters 481, 481 should preferably be provided on the image recording table 214.

As mentioned above, an image of a desired size is recorded in the image recording section 210. As long as image recording is being carried out, the recording belt 201 is kept stationary at a predetermined position so that the portion of the recording belt 201 on which the image is being recorded faces the radiation source 211. When the recording of an image is finished, the recording belt 201 is conveyed by the rotation of rollers 441, 442, 451 and 452 in the directions indicated by the arrows, and the portion of the recording belt 201 on which the image has been recorded is conveyed to the image read-out section 220 disposed on the right side below the recording belt 201. Of the rollers 441, 442, 451 and 452, only roller 452 is a drive roller and is connected to the shaft 453a of a motor 453 by a belt or a chain 454. The other rollers 441, 442 and 451 are driven rollers which are rotated by the action of the drive roller 452. As shown in FIG. 21, a rotary encoder 455 is secured to the shaft 453a of the motor 453 for detecting the degree of rotation of the motor 453 and carrying out various control operations. The roller 441 of the first roller section 440 is a tension roller urged in a direction that puts tension on the recording belt 201. By providing the tension roller in the group of rollers around which the recording belt 201 is applied, the recording belt 201 can be conveyed accurately without slacking and without exhibiting unstable movement.

Further, one end of a shaft 442a of the roller 442 in the first roller section 440 is secured to a belt 445a which is applied around a pair of rollers 445b and 445c and which is moved by the rotation of a motor 445d connected to the roller 445b, so that when the belt 445a is moved one end of the roller 442 can be moved as shown in FIG. 20. By obliquely moving (deflecting) the roller 442 when necessary, the direction of conveyance of the recording belt 201 can be corrected when the recording belt 201 moves in a zigzag fashion. In cases where the directions of conveyance of the recording belt 201 on the upstream and downstream sides of the roller 442 make an angle of 90° with respect to each other as shown in FIG. 20, the movement of the one end of the roller 442 should be carried out so that the roller 442 is always positioned in a plane making an angle of 45° with respect to both the directions of conveyance of the recording belt 201 on the upstream and downstream sides of the roller 442. By moving one end of the roller 442, a zigzag-type movement of the recording belt 201 can be eliminated without changing the length of conveyance of the recording belt 1.

The recording belt 201 is conveyed by the two sets of roller sections 440 and 450 until the portion of the recording belt 201 on which the image has been stored is brought to the image read-out section 220, and the image is read out from said portion of the recording belt 201. Information such as the size of the image and the position at which the image was recorded is specified at the selection means 484 and transmitted to the image read-out section 220. The image read-out section 220 begins image read-out on the basis of the information, and the picture element density and other conditions are adjusted in accordance with the image size. In this embodiment, the configuration of the image read-out section 220 is symmetrical to the configuration shown in FIG. 16 such that in FIG. 20 the side of the photodetector 229C is viewed, instead of the side of the light guide rod 229B. In FIG. 21, reference numeral 220A denotes an optical system region 20A which accommodates the optical system for scanning the stimulating rays in the image read-out section 220.

The portion of the recording belt 1 from which an image has been read-out is moved by the first roller section 440 and the second roller section 450 to the erasing section 230. The erasing section 230 comprises the case 231, and a plurality of (by way of example, eight) erasing light sources 232, 232, . . . constituted of fluorescent lamps or the like and disposed in the case 231. Reference numeral 433 denotes a filter for filtering out ultraviolet ray components in the erasing light. In this embodiment, image read-out and erasing are carried out on a single image forming area simultaneously for a predetermined period. Therefore, in order to eliminate the problem of erasing light leaking from the erasing section 230 and entering the image read-out section 220 when an image is being read-out, two pairs of nip rollers 461 and 462 are provided at both extremities of the erasing section 230 to grasp the recording belt 201 and prevent the erasing light from entering the image read-out section 220 along the surface of the recording belt 201. Also, in the erasing section 230 the nip rollers 461, 462 and the surface of the recording belt 201 on the side opposite to the erasing light sources 232, 232, . . . are covered by a light shielding plate 463, which reliably shields the erasing light. Also, in this embodiment, a roller 464 for deviating the position of conveyance of the recording belt 201 upward is provided between the image read-out section 220 and the erasing section 230. The roller 464 also has the effect of shielding the image read-out section 220 from the erasing light. Erasing may be carried out only on the portion of the recording belt 201 that was exposed to radiation at the image recording section 210. Therefore, the erasing of a portion of the recording belt 201 at which a small-sized image was recorded can be completed within a comparatively short time, and erasing can be done efficiently in accordance with the size of the recorded image.

With this embodiment wherein portions of the recording belt 201 in the image recording section 210 which need not be exposed to radiation are covered by the radiation blocking shutter 481, erasing may be carried out only on the area of the recording belt 201 on which an image was formed and can therefore be done efficiently.

In this embodiment, the stimulable phosphor layer need not necessarily be formed over the overall surface of the recording belt 201, and one or a plurality of the stimulable phosphor layers each having the length of the largest single image may be formed at different parts of the recording belt 201. Also, in order to make the apparatus smaller, the predetermined distance between the edges of the two sets of roller sections should preferably be not more than 1.5 times as long as the length of the largest image recordable in the apparatus. In such cases, the housing of the apparatus may be made comparatively large. Alternatively, as shown in FIG. 20, an image recording table 214' may project horizontally from the upper surface of the housing so that an object can be supported reliably. The configurations of the other parts of the apparatus are not limited to those described in the aforesaid embodiment.

Figure 24:
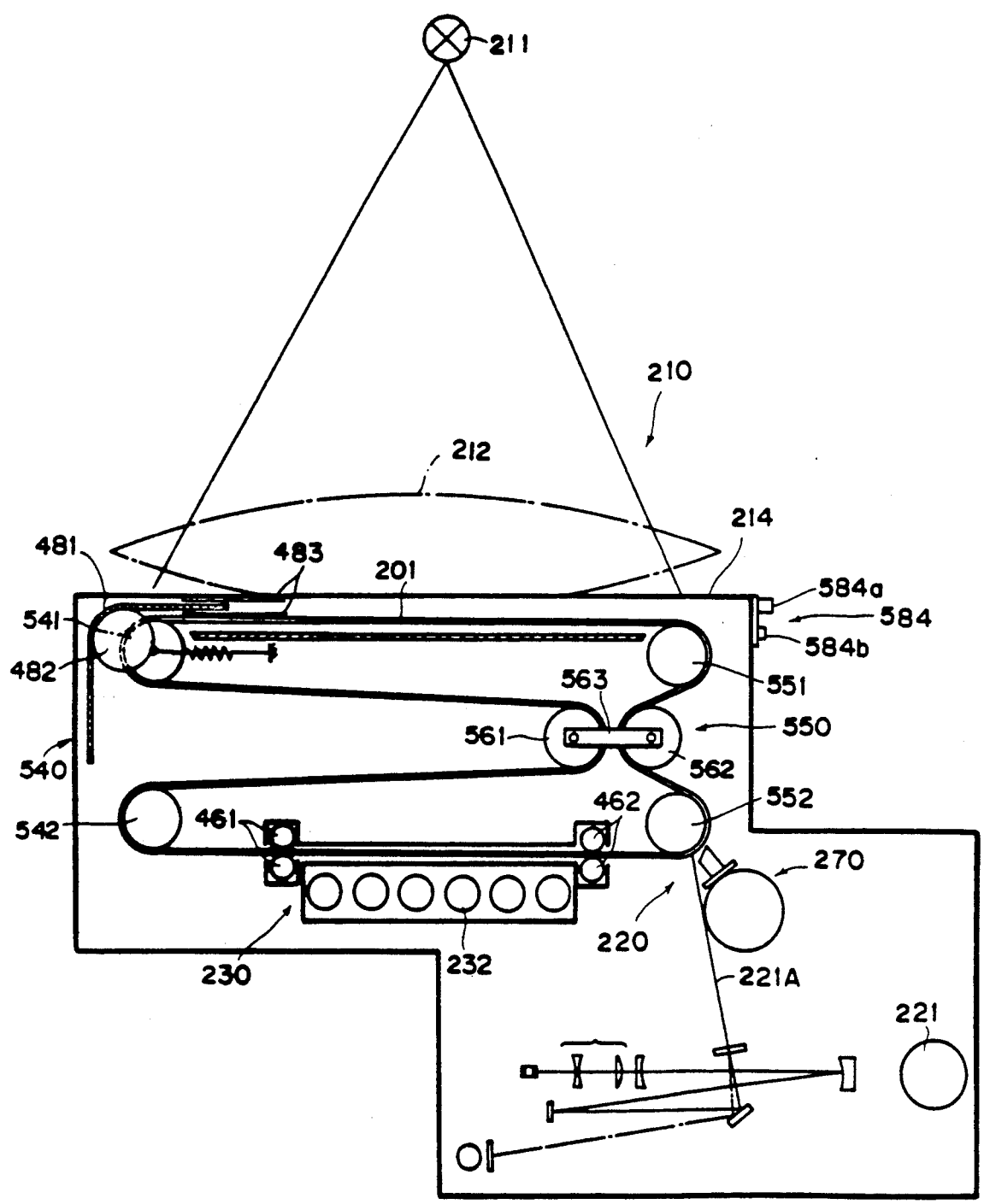
FIG. 24 is a side view showing another embodiment of the fourth radiation image recording and read-out apparatus in accordance with the present invention.

Another embodiment of the fourth radiation image recording and read-out apparatus in accordance with the present invention will hereinbelow be described with reference to FIG. 24. In FIG. 24, similar elements are numbered with the same reference numerals with respect to FIG. 20.

With reference to FIG. 24, a group of rollers for conveying and circulating the recording belt 201 therearound comprises a first roller section 540 constituted of an upper roller (tension roller) 541 and a lower roller 542, and a second roller section 550 constituted of an upper roller 551 and a lower roller 552. The group of rollers also comprises two idle rollers 561 and 562, and two pairs of nip rollers 461 and 462 provided respectively on the downstream and upstream sides of the erasing section 230. The shaft-to-shaft distance between the first roller section 540 and the second roller section 550 is approximately equal to the length of the largest single image recorded in the image recording section 210. The idle rollers 561 and 562 are provided between the upper rollers 541, 551 and the lower rollers 542, 552 so that the recording belt 201 is applied around the idle rollers 561 and 562. The idle rollers 561 and 562 are connected together by a connection means 563, and may be moved in a horizontal direction in FIG. 24 by a movement means (not shown). The image recording section 210 is provided with a radiation blocking shutter 481 which is moved by a sprocket wheel 482 along the guide plates 483, 483. In this embodiment, the radiation blocking shutter 481 is provided only on one side of the image recording section 210. The shutter 481 is moved between an open position and a closed position in accordance with the large-sized image or the small-sized image selected by a selection means 584 provided with pushbuttons 584a and 584b. (In FIG. 24, the shutter 481 is located at its closed position.)

With this embodiment wherein the idle rollers 561 and 562 are moved together horizontally so that the lengths of conveyance of the recording belt 201 on the upstream and downstream sides of the image recording section 210 are changed, a plurality of image recording steps can be carried efficiently. For the recording of small-sized images, the relationship between the movement of the idle rollers 561, 562 and the operation of elements of the apparatus is the same as the relationship between the movement of the idle rollers 261, 262 and the operation of elements of the apparatus mentioned above with reference to FIGS. 17A through 17G. For the recording of large-sized images, the relationship between the movement of the idle rollers 561, 562 and the operation of elements of the apparatus is the same as the relationship between the movement of the idle rollers 261, 262 and the operation of elements of the apparatus mentioned above with reference to FIGS. 18A through 18G. For the recording of large-sized images, the shutter 481 is retracted to its open position.

In the aforesaid embodiments, the radiation source 211 is not provided with an irradiation field stop, and in the image recording section 210 radiation is irradiated toward the overall surface of the recording belt 201. However, in the present invention, the radiation source 211 may be provided with an irradiation field stop, and the radiation blocking shutter 481 may be moved in accordance with the adjustment of an irradiation field by the irradiation field stop. Specifically, as shown in FIG. 25, the radiation source 211 may be provided with an irradiation field stop 415 having shutter members 415a, 415a each of which is moved in the directions indicated by the arrows for adjusting the size of the opening through which the radiation is irradiated. In such cases, in order to indicate the image recording range on the image recording table 214 after adjusting the irradiation field, a lamp 416 is provided in the vicinity of the radiation source 211 and is turned on prior to irradiation. The image recording area is illuminated on the surface of the image recording table 214 by the visible light produced by the lamp 416. Therefore, optical sensors 417, 417 may be provided so as to receive the visible light, and the radiation blocking shutters 481, 481 may be moved so as to align with the irradiation field in accordance with the outputs of the optical sensors 417, 417. In cases where optical sensors cannot readily be provided directly in the vicinity of the image recording table 214, the visible light may be received by a light receiving edge of an optical fiber and transmitted to an optical sensor provided at an arbitrary location. In cases where the radiation blocking shutter 481 is provided on the side of the image recording section and the radiation source 211 is provided with the irradiation field stop 415, radiation scattered from the object does not impinge upon recording belt portions outside of the image recording area. Therefore, after the image has been read-out, erasing may be carried out only on the image recording area.

What is claimed is:

1. A radiation image recording and read-out apparatus comprising:
   (i) a recording belt composed of an endless belt constituted of a transparent supporting material and a stimulable phosphor layer formed on a surface of said supporting material,
   (ii) a group of rollers, around which said recording belt is applied, including two sets of roller sections spaced apart from each other by a predetermined distance, for conveying and circulating said recording belt between said two sets of roller sections along said predetermined distance,
   (iii) an image recording section for exposing said stimulable phosphor layer to radiation which has passed through an object in order to store a radiation image of the object on said stimulable phosphor layer,
   (iv) an image read-out section provided with a stimulating ray source for emitting stimulating rays for scanning said stimulable phosphor layer carrying said radiation image stored thereon, and a photoelectric read-out means for obtaining an electric image signal by reading out light emitted by said stimulable phosphor layer, which light is emitted in proportion to the stored radiation energy when said stimulable phosphor layer is scanned and stimulated with the stimulating rays, and
   (v) an erasing section for eliminating radiation energy remaining on said stimulable phosphor layer by exposing said stimulable phosphor layer to erasing light produced by an erasing light source prior to recording a next image on said stimulable phosphor layer after a preceding radiation image is read out therefrom at said image read-out section,
   wherein the improvement comprises:
   (a) said predetermined distance between said two sets of the roller sections being made 1-1.5 times as long as the length of the largest single image which can be recorded in said image recording section,
   (b) said image recording section being provided so as to face said recording belt moving between said two sets of the roller sections,
   (c) said image read-out section is positioned such that scanning of said stimulating rays is carried out on a portion of said stimulable phosphor layer present on the circumferential surface of a roller in said group of rollers, and
   (d) at least one roller in said group of rollers, which roller is present on a downstream side of said image read-out section as viewed in the direction of conveyance of said recording belt, is a hollow transparent roller, and said erasing light source is provided inside of said transparent roller.

2. An apparatus as defined in claim 1 wherein said photoelectric read-out means in said image read-out section comprises an elongated photomultiplier having a light receiving face extending along a scanning line of said stimulating rays, said elongated photomultiplier being disposed close to said recording belt.

3. An apparatus as defined in claim 1 wherein said image read-out section is provided to carry out scanning of said stimulating rays on said stimulable phosphor layer present on the circumferential surface of a roller in one of said roller sections.

4. A radiation image recording and read-out apparatus comprising:
   (i) a recording belt composed of an endless belt provided with a stimulable phosphor layer,
   (ii) a group of rollers, around which said recording belt is applied, including two sets of roller sections spaced apart from each other by a predetermined distance, for conveying and circulating said recording belt between said two sets of roller sections along said predetermined distance,
   (iii) an image recording section for exposing said stimulable phosphor layer to radiation which has passed through an object to have a radiation image of the object stored on said stimulable phosphor layer, (iv) an image read-out section provided with a stimulating ray source for emitting stimulating rays for scanning said stimulable phosphor layer carrying said radiation image stored thereon, and a photoelectric read-out means for obtaining an electric image signal by reading out light emitted by said stimulable phosphor layer, which light is emitted in proportion to the stored radiation energy when said stimulable phosphor layer is scanned and stimulated with the stimulating rays, and (v) an erasing section for eliminating radiation energy remaining on said stimulable phosphor layer prior to recording a next image on said stimulable phosphor layer after a preceding radiation image is read out therefrom at said image read-out section, wherein the improvement comprises:

(a) said predetermined distance between said two sets of the roller sections being made 1-1.5 times as long as the length of the largest single image which can be recorded in said image recording section, and each of said roller sections being composed of two roller subsections separated from each other in such a way that an imaginary line joining the separated roller subsections is normal to an imaginary line joining said two sets of roller sections separated by said predetermined distance, (b) said group of rollers being provided with an idle roller section moveable from a position between said two roller subsections of one of said two sets of roller section, and a position between said two roller subsections of the other of said two sets of roller sections, said idle roller sections being moveable such that a portion of said recording belt can be maintained stationary at said image recording section while a portion of the remainder of said recording belt concurrently can be moved past said image read-out section, (c) said image recording section being provided so as to face said recording belt moving between a roller subsection of one of said two sets of the roller sections and a roller subsection of the other of said two sets of roller sections, which roller subsections face each other, and (d) said image read-out section being positioned such that scanning of said stimulating rays is carried out on a portion of said stimulable phosphor layer present on a roller in said group of rollers, which roller does not belong to said idle roller section.

5. An apparatus as defined in claim 4 wherein said photoelectric read-out means at said image read-out section comprises an elongated photomultiplier having a light receiving face extending along a scanning line of said stimulating rays, said elongated photomultiplier being disposed close to said recording belt.

6. An apparatus as defined in claim 4 wherein said image read-out section is provided so as to carry out scanning of said stimulating rays on said portion of said stimulable phosphor layer present on the circumferential surface of a roller in one of said roller sections.

7. A radiation image recording and read-out apparatus comprising:

(i) a recording belt composed of an endless belt provided with a stimulable phosphor layer, (ii) a group of rollers, around which said recording belt is applied, including two sets of roller sections spaced apart from each other by a predetermined distance, for conveying and circulating said recording belt between said two sets of roller sections along said predetermined distance, (iii) an image recording section for exposing said stimulable phosphor layer to a radiation which has passed through an object in order to store a radiation image of the object on said stimulable phosphor layer, (iv) an image read-out section provided with a stimulating ray source for emitting stimulating rays for scanning stimulable phosphor layer carrying said radiation image stored thereon, and a photoelectric read-out means for obtaining an electric image signal by reading out light emitted by said stimulable phosphor layer, which light is emitted in proportion to the stored radiation energy when said stimulable phosphor layer is scanned and stimulated with the stimulating rays, and (v) an erasing section for eliminating radiation energy remaining on said stimulable phosphor layer prior to recording a next image on said stimulable phosphor layer after a preceding radiation image is read out therefrom at said image read-out section, wherein the improvement comprises:

(a) said predetermined distance between said two sets of the roller sections being made 1.-1.5 times as long as the length of the largest single image which can be recorded in said image recording section, (b) said image recording section being provided so as to face said recording belt moving between said two sets of roller sections, and being provided with a radiation blocking shutter moveable between a closed position, at which said radiation blocking shutter covers a portion of said recording belt located at an edge of the image recording area in said image recording section, and an open position at which said radiation blocking shutter is retracted from above said recording belt in said image recording section, and (c) said image read-out section being positioned such that scanning by said stimulating rays is carried out on a portion of said stimulable phosphor layer present on the circumferential surface of a roller in said group of rollers.

8. An apparatus as defined in claim 7 wherein a roller in one of said roller sections is a tension roller urged in a direction that puts tension on said recording belt.

9. An apparatus as defined in claim 7 wherein said photoelectric read-out means in said image read-out section comprises an elongated photomultiplier having a light receiving face extending along a scanning line of said stimulating rays, said elongated photomultiplier being disposed close to said recording belt.

10. An apparatus as defined in claim 7 wherein said image read-out section is provided so as to carry out scanning of said stimulating rays on said stimulable phosphor layer present at a circumferential surface of a roller in one of said roller sections.

11. A radiation image recording and read-out apparatus comprising:

(i) a recording belt composed of an endless belt provided with a stimulable phosphor layer, (ii) a group of rollers, around which said recording belt is applied, including two sets of roller sections spaced apart from each other by a predetermined distance, for conveying and circulating said recording belt between said two sets of roller sections along said predetermined distance, (iii) an image recording section for exposing said stimulable phosphor layer to a radiation which has passed through an object in order to store a radiation image of the object on said stimulable phosphor layer, (iv) an image read-out section provided with a stimulating ray source for emitting stimulating rays for scanning said stimulable phosphor layer carrying said radiation image stored thereon, and a photoelectric read-out means for obtaining an electric image signal by reading out light emitted by said stimulable phosphor layer, which light is emitted in proportion to the stored radiation energy when said stimulable phosphor layer is scanned and stimulated with the stimulating rays, and (v) an erasing section for eliminating radiation energy remaining on said stimulable phosphor layer prior to recording a next image on said stimulable phosphor layer after a preceding radiation image is read out therefrom at said image read-out section, wherein the improvement comprises:

(a) said predetermined distance between said two sets of the roller sections being made 1-1.5 times as long as the length of the largest single image which can be recorded in said image recording section, (b) said image recording section being provided so as to face said recording belt moving between said two sets of roller sections, and being provided with a radiation blocking shutter moveable between a closed position, at which said radiation blocking shutter covers a portion of said recording belt located at an edge of the image recording area in said image recording section, and an open position at which said radiation blocking shutter is retracted from above said recording belt in said image recording section, and (c) said image read-out section being positioned such that scanning by said stimulating rays is carried out on a portion of said stimulable phosphor layer present on the circumferential surface of a roller in said group of rollers, wherein said group of rollers includes two idle rollers connected together and moveable for changing the lengths of conveyance of portions of said recording belt on the upstream and downstream sides of said image recording section.

* * * * *